US008208064B2

(12) United States Patent
Kosuge et al.

(10) Patent No.: US 8,208,064 B2
(45) Date of Patent: Jun. 26, 2012

(54) WIPE VIDEO SIGNAL PROCESSING APPARATUS, WIPE VIDEO SIGNAL PROCESSING METHOD, COMPUTER PROGRAM PRODUCT, AND IMAGE DISPLAY APPARATUS

(75) Inventors: Shoji Kosuge, Kanagawa (JP); Shingo Shimazaki, Kanagawa (JP); Mikio Ishii, Kanagawa (JP); Hiroshi Higuchi, Kanagawa (JP); Masahiro Take, Kanagawa (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 12/098,519

(22) Filed: Apr. 7, 2008

(65) Prior Publication Data

US 2008/0246880 A1 Oct. 9, 2008

(30) Foreign Application Priority Data

Apr. 9, 2007 (JP) ................ P2007-101261

(51) Int. Cl.
*H04N 5/66* (2006.01)
*H04N 5/445* (2011.01)
*G09G 5/00* (2006.01)
*G06F 3/00* (2006.01)
*G06F 17/00* (2006.01)

(52) U.S. Cl. ........ 348/383; 348/564; 345/629; 345/630; 345/635; 345/620; 715/726; 715/247

(58) Field of Classification Search .......... 348/383, 348/564, E5.099; 345/629, 630, 635, 620; 345/FOR. 141; 715/726, 247, FOR. 231
See application file for complete search history.

(56) References Cited

U.S. PATENT DOCUMENTS

| 4,805,022 A * | 2/1989 | Abt ........................... 348/594 |
| 6,357,047 B1 * | 3/2002 | Kurtze et al. ............... 725/151 |
| 2006/0210124 A1 * | 9/2006 | Ishii ............................ 382/118 |

FOREIGN PATENT DOCUMENTS

| JP | 1 251185 | 10/1989 |
| JP | 5 30423 | 2/1993 |
| JP | 6 303561 | 10/1994 |
| JP | 7 298137 | 11/1995 |
| JP | 2000165122 | * 6/2000 |
| JP | 2000 244814 | 9/2000 |
| JP | 2000-244814 | * 9/2000 |
| WO | WO 2005 032125 | 4/2005 |

* cited by examiner

Primary Examiner — Hoang-Vu A Nguyen-Ba
(74) Attorney, Agent, or Firm — Frommer Lawrence & Haug LLP; William S. Frommer; Paul A. Levy

(57) ABSTRACT

A video signal processing apparatus includes a video signal synthesis section for, when positions after and before a border position by a predetermined length are respectively set as first and second positions, taking out a first main area part corresponding to a part before the border position and a first border area part corresponding to a part from the border position to the first position from a first video signal and also a second border area part corresponding to a part from the second position to the border position and a second main area part corresponding to a part after the border position from a second video signal for synthesis, an image processing section for performing an image processing on the synthesized video signal, and a video signal output section for removing the first and second border area parts from the synthesized video signal to obtain an output video signal.

9 Claims, 22 Drawing Sheets

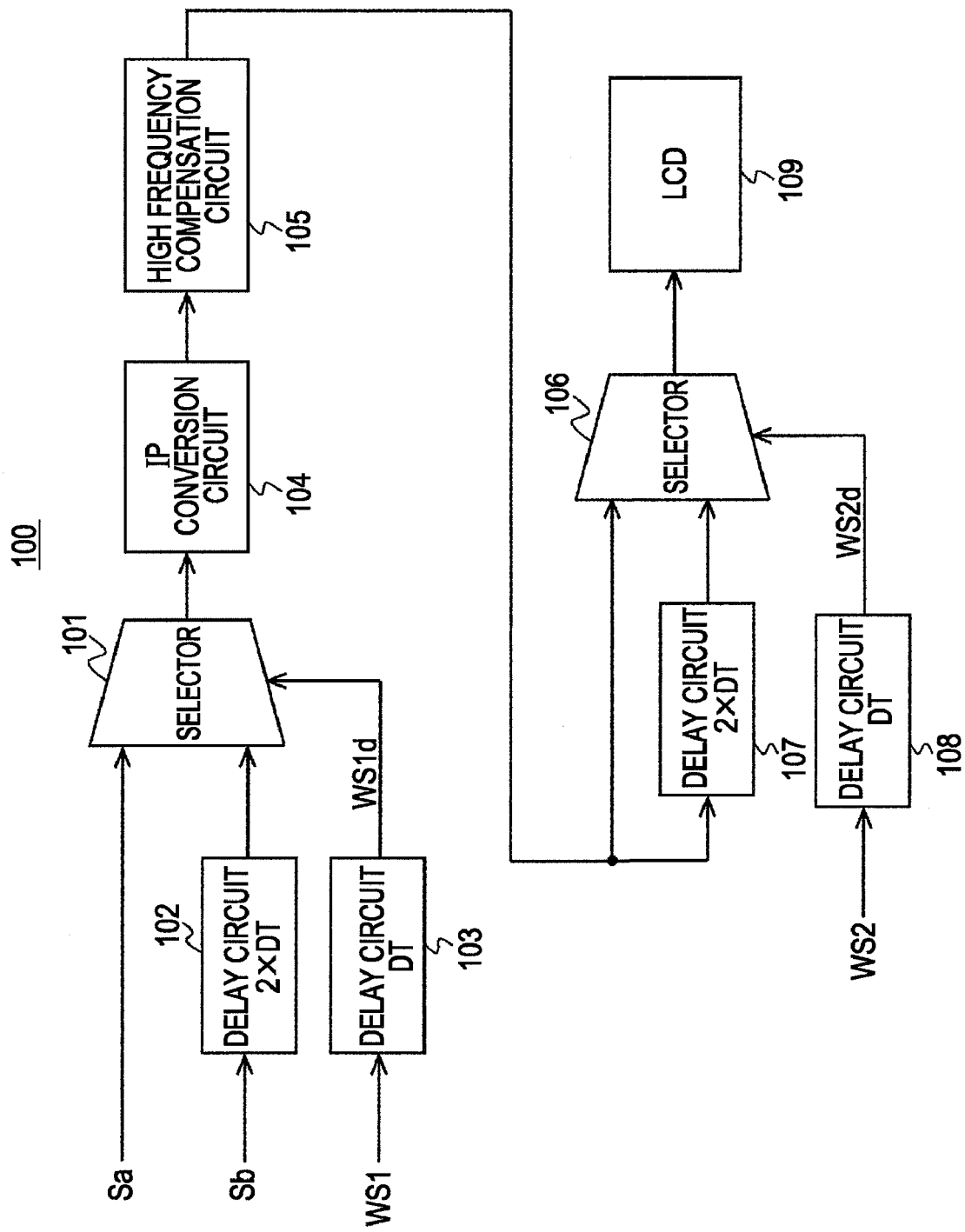

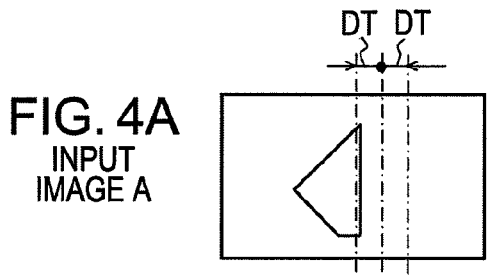
FIG. 4A INPUT IMAGE A
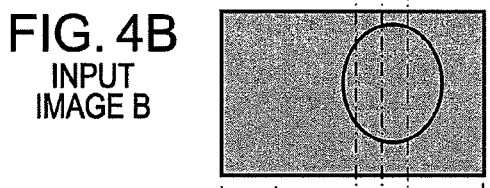
FIG. 4B INPUT IMAGE B
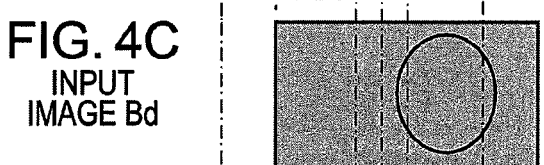
FIG. 4C INPUT IMAGE Bd
FIG. 4D WS1
FIG. 4E WS1d
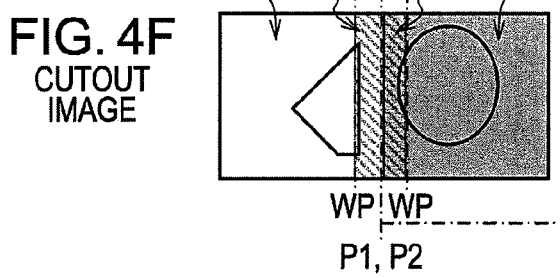
FIG. 4F CUTOUT IMAGE
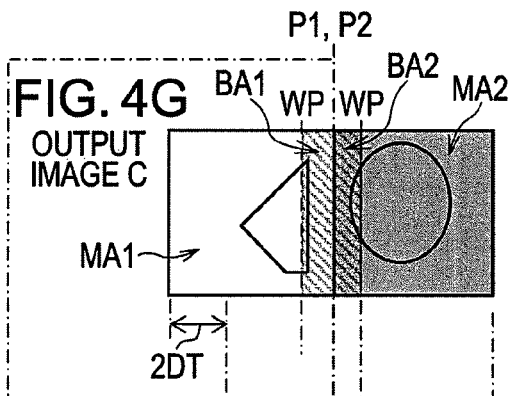
FIG. 4G OUTPUT IMAGE C
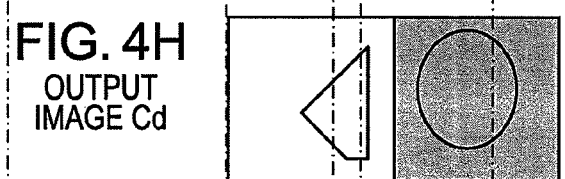
FIG. 4H OUTPUT IMAGE Cd
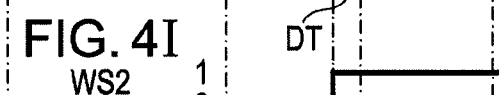
FIG. 4I WS2
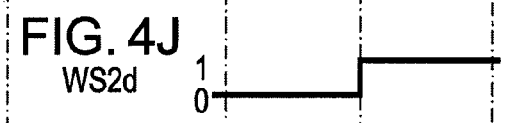
FIG. 4J WS2d
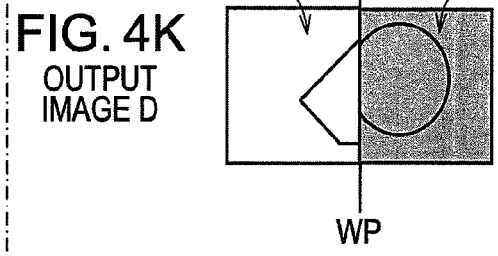
FIG. 4K OUTPUT IMAGE D

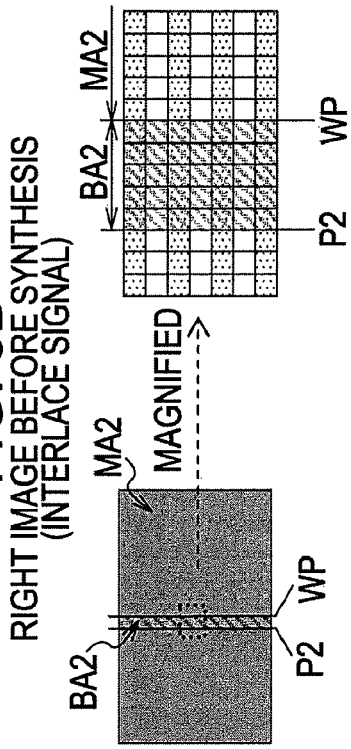
FIG. 5A
LEFT IMAGE BEFORE SYNTHESIS
(INTERLACE SIGNAL)
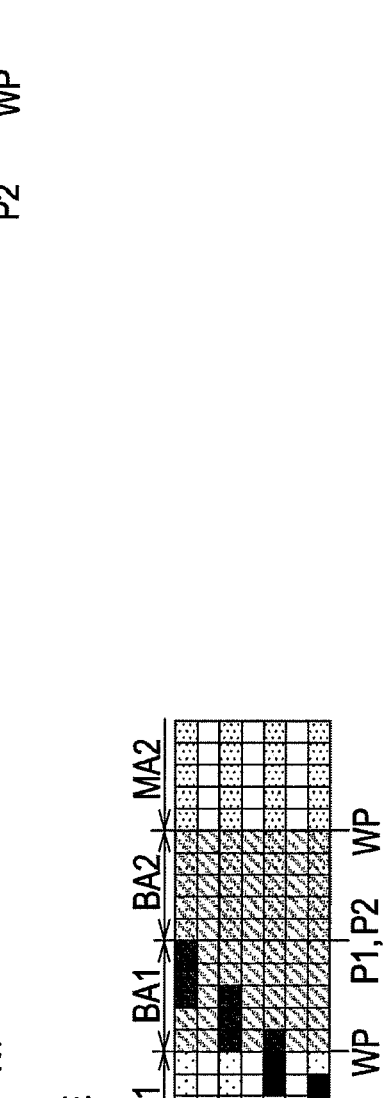
FIG. 5B
RIGHT IMAGE BEFORE SYNTHESIS
(INTERLACE SIGNAL)
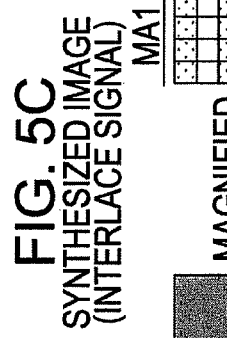
FIG. 5C
SYNTHESIZED IMAGE
(INTERLACE SIGNAL)
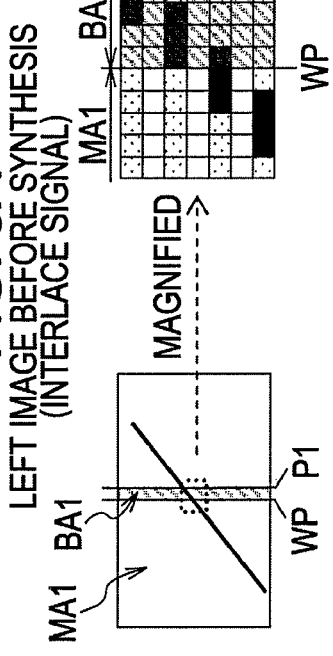
FIG. 5D
IMAGE AFTER IP CONVERSION
(PROGRESSIVE SIGNAL)
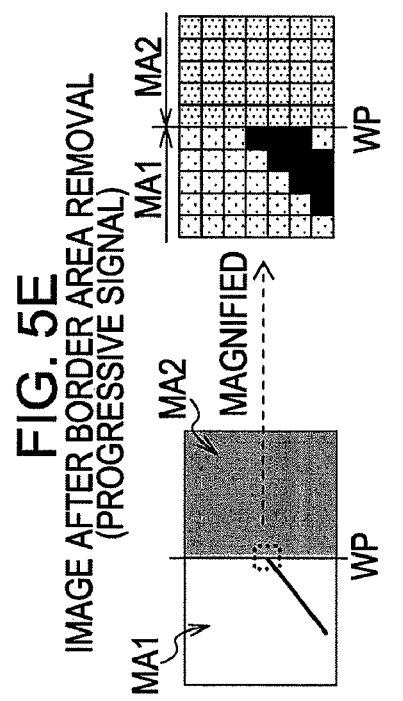
FIG. 5E
IMAGE AFTER BORDER AREA REMOVAL
(PROGRESSIVE SIGNAL)
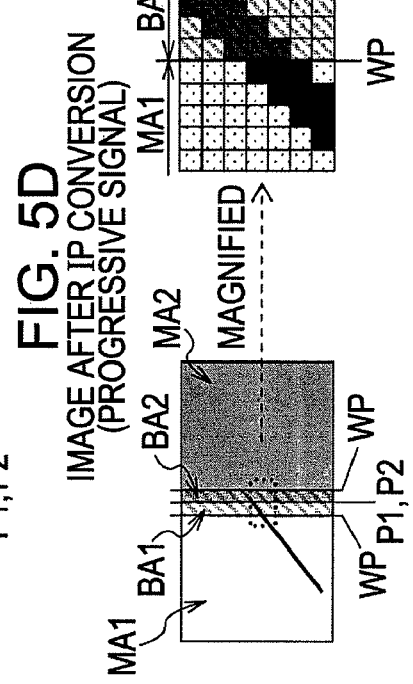

FIG. 6A
LEFT IMAGE
(MOTION PICTURE DETERMINATION)
(INTERLACE SIGNAL)

FIG. 6B
RIGHT IMAGE
(STILL IMAGE DETERMINATION)
(INTERLACE SIGNAL)

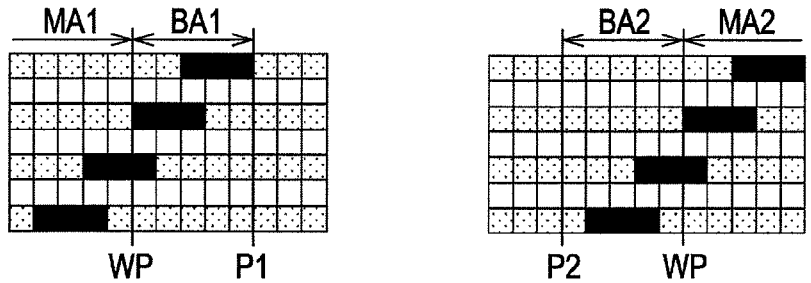

FIG. 6C SYNTHESIZED IMAGE (INTERLACE SIGNAL)

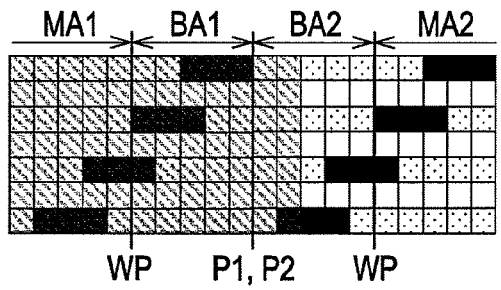

FIG. 6D IMAGE AFTER IP CONVERSION THROUGH DIAGONAL INTERPOLATION (PROGRESSIVE SIGNAL)

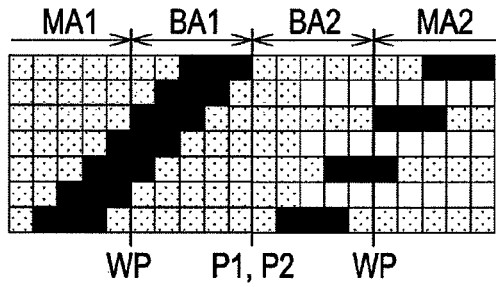

FIG. 6E
IMAGE AFTER IP CONVERSION
THROUGH DIAGONAL INTERPOLATION
(AFTER BORDER AREA REMOVAL)

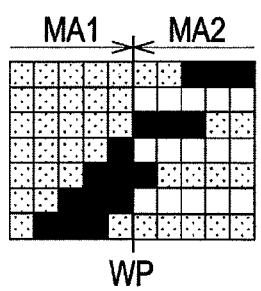

FIG. 6F
IMAGE AFTER IP CONVERSION
THROUGH DIAGONAL INTERPOLATION
(EXPECTED RESULT)

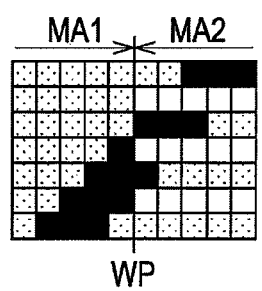

FIG. 7A
LEFT IMAGE
(MOTION PICTURE DETERMINATION)
(INTERLACE SIGNAL)

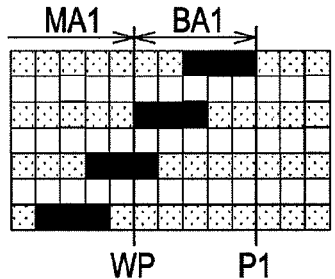

FIG. 7B
RIGHT IMAGE
(STILL IMAGE DETERMINATION)
(INTERLACE SIGNAL)

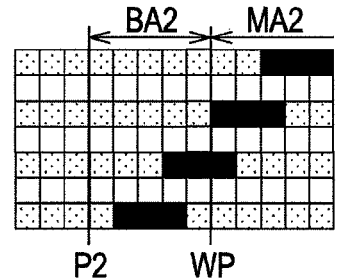

FIG. 7C SYNTHESIZED IMAGE
(INTERLACE SIGNAL)

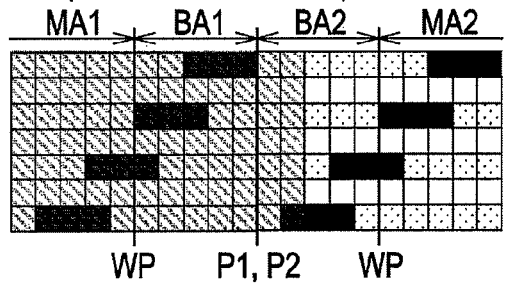

FIG. 7D IMAGE AFTER IP CONVERSION THROUGH VERTICAL INTERPOLATION
(INTERLACE SIGNAL)

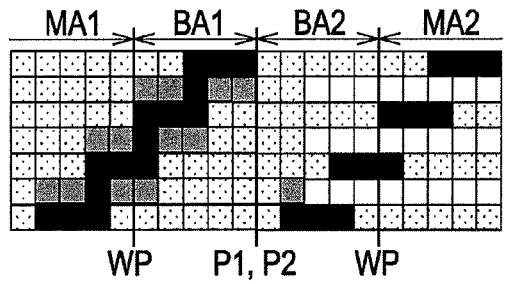

FIG. 7E
IMAGE AFTER IP CONVERSION
THROUGH VERTICAL INTERPOLATION

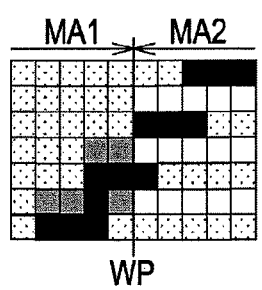

FIG. 7F
IMAGE AFTER IP CONVERSION
THROUGH VERTICAL INTERPOLATION
(EXPECTED RESULT)

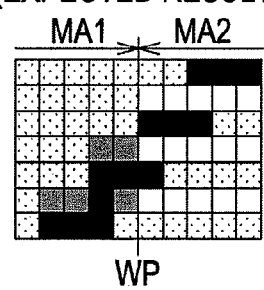

WAVEFORM
OF LINE N

WAVEFORM
OF LINE N

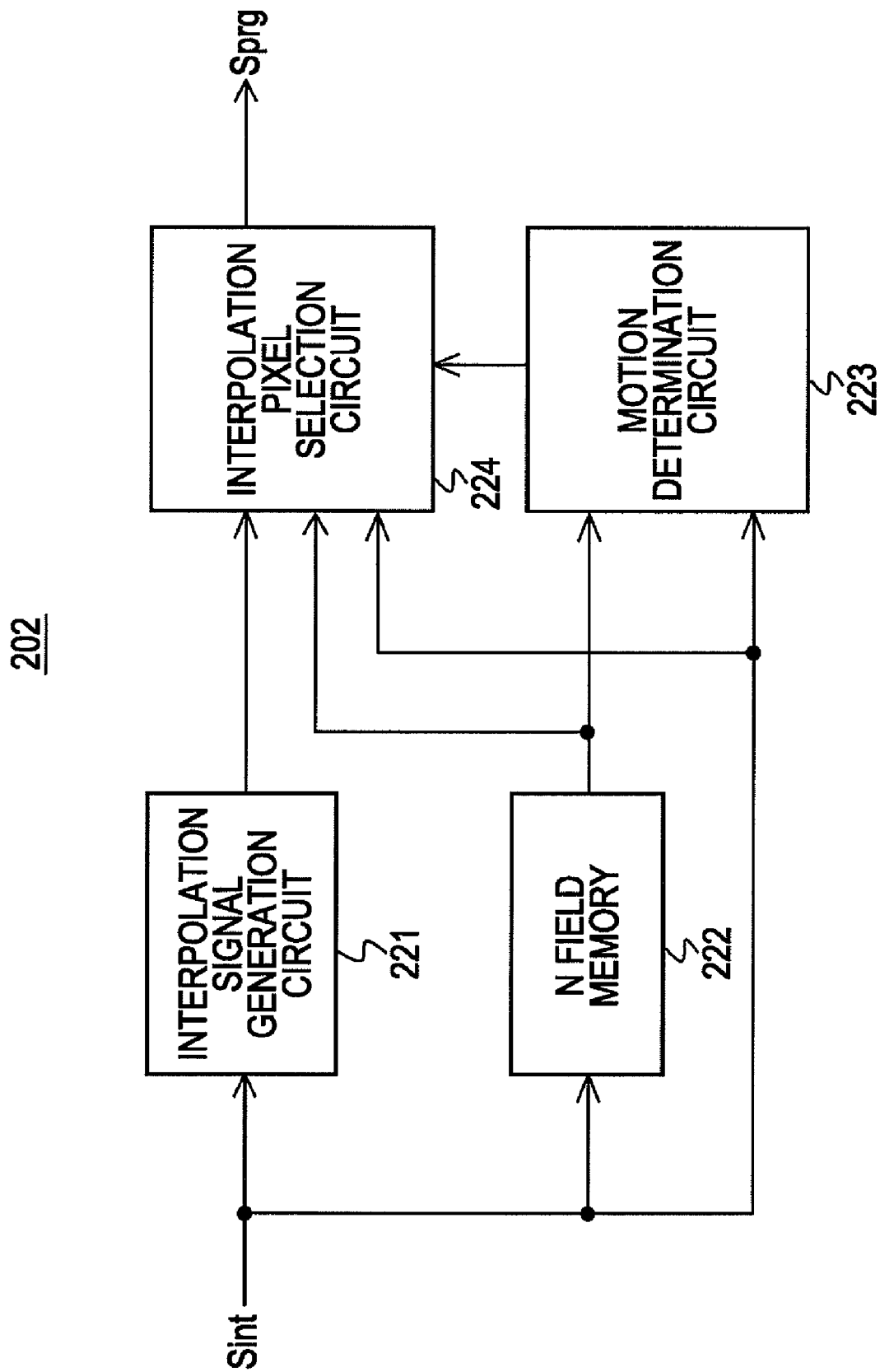

Sint

Sprg
(DIAGONAL INTERPOLATION)

← INTERPOLATION LINE

Sprg
(VERTICAL INTERPOLATION)

← INTERPOLATION LINE

MOTION DETERMINATION

N-2 FIELD     N-1 FIELD     N FIELD

Sprg
(DIAGONAL INTERPOLATION)

← INTERPOLATION LINE

Sprg
(VERTICAL INTERPOLATION)

← INTERPOLATION LINE

MOTION DETERMINATION

N−2 FIELD    N−1 FIELD    N FIELD $\begin{pmatrix} \text{Sprg} \\ \text{STILL IMAGE} \\ \text{PROCESSING} \end{pmatrix}$

INTERPOLATION LINE

WIPE OPERATION

INPUT IMAGE A

INPUT IMAGE B

WS

SYNTHESIZED IMAGE

OUTPUT IMAGE

WP

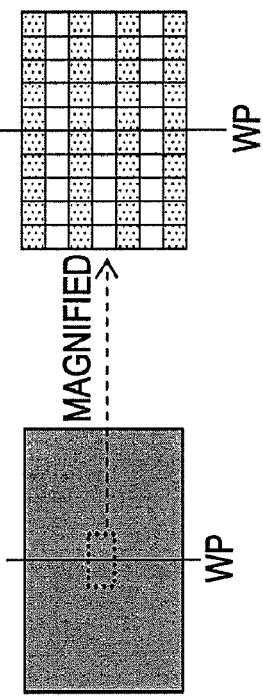
FIG. 20A LEFT IMAGE BEFORE SYNTHESIS (INTERLACE SIGNAL)
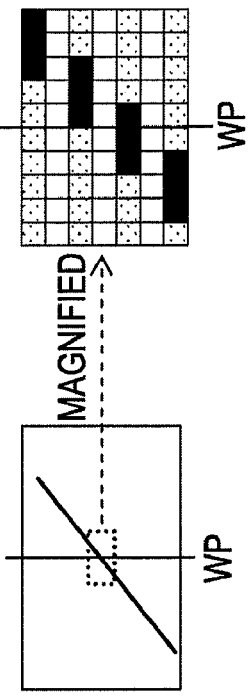
FIG. 20B RIGHT IMAGE BEFORE SYNTHESIS (INTERLACE SIGNAL)
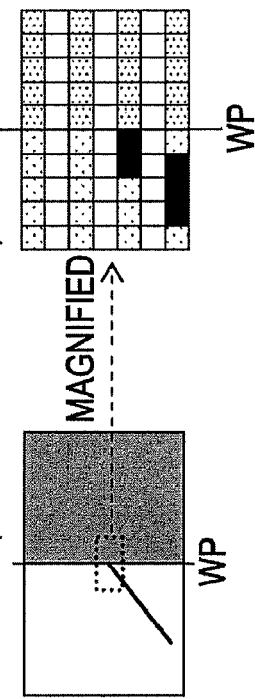
FIG. 20C SYNTHESIZED IMAGE (INTERLACE SIGNAL)
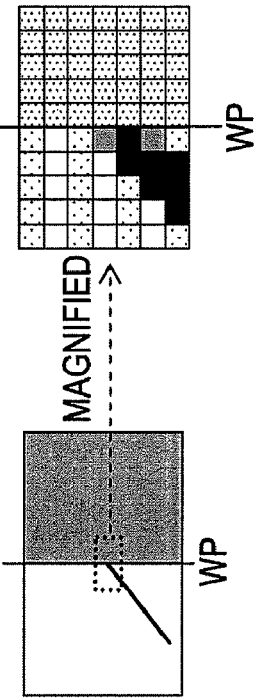
FIG. 20D IMAGE AFTER IP CONVERSION (PROGRESSIVE SIGNAL)

FIG. 21A
LEFT IMAGE
(MOTION PICTURE DETERMINATION)
(INTERLACE SIGNAL)

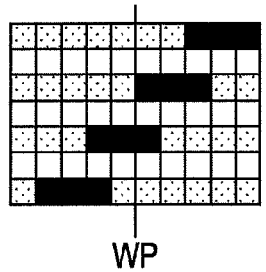

WP

FIG. 21B
RIGHT IMAGE
(STILL IMAGE DETERMINATION)
(INTERLACE SIGNAL)

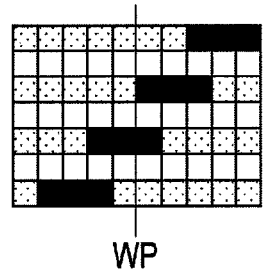

WP

FIG. 21C
SYNTHESIZED IMAGE
(INTERLACE SIGNAL)

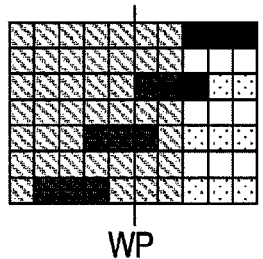

WP

FIG. 21D
IMAGE AFTER IP CONVERSION
THROUGH DIAGONAL INTERPOLATION

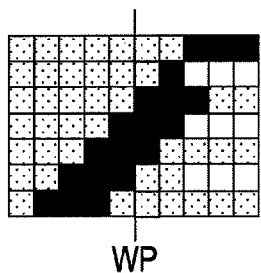

WP

FIG. 21E
IMAGE AFTER IP CONVERSION
THROUGH DIAGONAL INTERPOLATION
(EXPECTED RESULT)

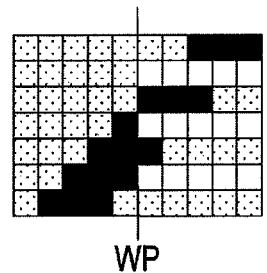

WP

FIG. 21F
IMAGE AFTER IP CONVERSION
THROUGH VERTICAL INTERPOLATION

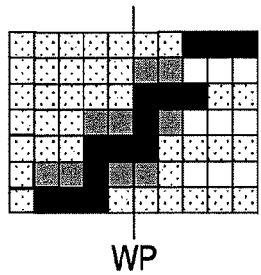

WP

FIG. 21G
IMAGE AFTER IP CONVERSION
THROUGH VERTICAL INTERPOLATION
(EXPECTED RESULT)

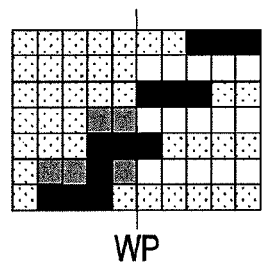

WP

WIPE VIDEO SIGNAL PROCESSING APPARATUS, WIPE VIDEO SIGNAL PROCESSING METHOD, COMPUTER PROGRAM PRODUCT, AND IMAGE DISPLAY APPARATUS

CROSS REFERENCES TO RELATED APPLICATIONS

The present invention contains subject matter related to Japanese Patent Application JP 2007-101261 filed in the Japanese Patent Office on Apr. 9, 2007, the entire contents of which are incorporated herein by reference.

BACKGROUND OF THE INVENTION

1. Field of the Invention

The present invention relates to, for example, a video signal processing apparatus, a video signal processing method, a computer program product, and an image display apparatus which are suitable to be applied for displaying a wipe image on a display screen. In detail, this invention relates to a video signal processing apparatus, etc., in which a synthesized video signal is generated by taking out main area parts contributing to an actual image display as well as border area parts from first and second video signals, and an output video signal is obtained by removing the border area parts after a predetermined image processing is performed on the synthesized video signal so that no gap is generated between a switching position for images and also the images at the switching position are displayed as the identical images on a full screen.

2. Description of the Related Art

Up to now, as an image display apparatus, for example, an image display apparatus having a wipe function is known as described in Japanese Unexamined Patent Application Publication No. 1-251185, etc. FIG. 11 illustrates a wipe operation example. An image A is displayed based on a first video signal, and an image B is displayed based on a second video signal. With respect to a wipe position (border position) horizontally dividing the screen, the image A is displayed before the wipe position, and the image B is displayed after the wipe position. As the wipe position is shifted from the left to the right, a display area for the image A is larger, and a display area for the image B is smaller.

During the wipe operation, an image based on a synthesized video signal is displayed in which the first video signal and the second video signal are synthesized. At this time, when a signal at a line N of the synthesized video signal is focused on, the signal at the line N is switched from the first video signal to the second video signal at the wipe position functioning as a border.

The wipe function is used for a special effect when the first image signal is transited to the second image signal, and also used when a difference between the two image based on the first and second image signals is observed. For example, an image based on a first video signal subjected to compression/decompression according to a first compression method and an image based on a second video signal subjected to compression/decompression according to a second compression method are displayed on the same screen. A difference in each part is observed by changing the wipe position to assess performances of the first and second compression methods and then compression parameters are accordingly adjusted, for example. When the difference between the two images based on the first and second image signals is observed in this way, such a situation is avoided that a gap at the switching position between the two images is generated.

FIG. 12 illustrates an example of an image display apparatus 200 having a wipe operation function in the related art. The image display apparatus 200 is provided with a selector 201, an IP conversion circuit 202, a high frequency compensation circuit 203, and an LCD (Liquid Crystal Display) 204.

A first video signal Sa and a second video signal Sb are input to the selector 201 while the first video signal Sa and the second video signal Sb are mutually synchronized. The video signals Sa and Sb are both interlace signals. Also, the selector 201 is supplied with a wipe switching control signal WS. The wipe switching control signal WS is in one state before a wipe position (border position) WP horizontally dividing the screen, for example, "0", and is in the other state, for example, "1".

The selector 201 is adapted to selectively take out the video signal Sa or the video signal Sb based on the wipe switching control signal WS to the synthesized video signal. That is, the selector 201 takes out the video signal Sa when the wipe switching control signal WS is in the one state, and takes out the video signal Sb when the wipe switching control signal WS is in the other state.

The IP conversion circuit 202 is adapted to convert the synthesized video signal obtained in the selector 201 from an interlace signal to a progressive signal. FIG. 13 illustrates a configuration example of the IP conversion circuit 202. The IP conversion circuit 202 is composed of an interpolation signal generation circuit 221, an N field memory 222, a motion determination circuit 223, and an interpolation pixel selection circuit 224.

The interlace signals Sint are input to the interpolation signal generation circuit 221. The interpolation signal generation circuit 221 is adapted to generate interpolation signals for the motion picture (interpolation line signals) from signals in the current field. The interpolation signal generation circuit 221 generates signals for the respective interpolation pixels constituting the interpolation line signals through a diagonal interpolation or a vertical interpolation. In a diagonal interpolation processing, pixel information in the vicinity of the interpolation pixels is used to detect a correlation in a diagonal direction. When it is determined that a correlation at a certain angle exists, signals at the upper and lower pixels in the diagonal direction are averaged to generate interpolation pixel signals. Also, in a vertical interpolation processing, signals at the upper and lower pixels with respect to the interpolation pixels are averaged to generate interpolation pixel signals.

The interlace signals Sint are input to the N field memory 222. The N field memory 222 stores and holds signals in N fields before the current field.

The interlace signals Sint (current field signals) and also signals in the past fields are input to the motion determination circuit 223 from the N field memory 222. The motion determination circuit 223 is adapted to determine whether this display is a motion picture or a still image in units of pixel by using the current field signals and the past field signals.

The interpolation pixel selection circuit 224 is adapted to generate and output the progressive signals Sprg based on signals in a field one before the field where the interlace signals Sint (current field signals) is output from the N field memory 222 and the interpolation line signal generated in the interpolation signal generation circuit 221. In this case, among the progressive signals Sprg, as signals in lines corresponding to the respective lines of the interlace signals Sint (current field signals), the interpolation pixel selection circuit 224 outputs the signals in the respective lines of the interlace signals Sint as they are. Also, as the interpolation line signals, when it is determined that this display is the motion picture in the motion determination circuit 223, the interpolation pixel selection circuit 224 outputs the signals generated in the interpolation signal generation circuit 221. When it is determined that this display is the still image in the motion determination circuit 223, the interpolation pixel selection circuit 224 outputs the signals in the field one before the current field.

FIGS. 14A to 14C illustrate examples of the interlace signals Sint, progressive signals Sprg through a diagonal interpolation, and progressive signals Sprg through a vertical interpolation. FIG. 14B illustrates the progressive signals Sprg obtained by subjecting the interlace signals Sint illustrated in FIG. 14A to the diagonal interpolation to generate interpolation signals. Through the diagonal interpolation, when it is determined that the correlation exists in the diagonal direction at the certain angle as described above, the signals at the upper and lower pixels in the diagonal direction are averaged to generate interpolation pixel signals, and therefore the diagonal line is smoothly interpolated.

In contrast to this, FIG. 14C illustrates the progressive signals Sprg obtained by subjecting the interlace signals Sint illustrated in FIG. 14A to the vertical interpolation to generate interpolation signals. Through the vertical interpolation, the signals at the upper and lower pixels with respect to the interpolation pixels are averaged to generate the interpolation pixel signals as described above, and therefore the diagonal line becomes blurring stepwise. For this phenomenon, the interpolation based on the diagonal interpolation is carried out in a large number of fixed pixel display apparatuses.

FIGS. 15A to 15C illustrate a motion determination in the motion determination circuit 223 (in the case of motion picture determination) and examples of the progressive signals Sprg generated in that case. The motion determination circuit 223 determines that this display is the motion picture because, for example, the signals in an N field (current field) are not the same as those in an N−2 field as illustrated in FIG. 15A. In this case, interpolation signals for the progressive signals Sprg are generated by using the signals in the N field (current field). FIG. 15B illustrates the progressive signals Sprg in a case where interpolation signals are generated through the diagonal interpolation. FIG. 15C illustrates the progressive signals Sprg in a case where interpolation signals are generated through the vertical interpolation.

FIGS. 16A and 16B illustrate a motion determination in the motion determination circuit 223 (in the case of still image determination) and examples of the progressive signals Sprg generated in that case. The motion determination circuit 223 determines that this display the still image because, for example, the signals in the N field (current field) are the same as those in the N−2 field as illustrated in FIG. 16A. In this case, as the interpolation signals for the progressive signals Sprg, signals in an N−1 field are used as they are. FIG. 16B illustrates the progressive signals Sprg when it is determined that this display the still image.

While returning back to FIG. 12, the high frequency compensation circuit 203 is adapted to emphasize high frequency components of the synthesized video signal (progressive signal) output from the IP conversion circuit 202. FIG. 17 illustrates a configuration example of the high frequency compensation circuit 203. The high frequency compensation circuit 203 is provided with a vertical high pass filter (vertical HPF) 231, a gain adjustment section 232, a horizontal high pass filter (horizontal HPF) 233, a gain adjustment section 234, and an adder 235.

The vertical HPF 231 is adapted to extract the high frequency components in the vertical direction from an input signal Sin. FIG. 18 illustrates a frequency characteristic example of the vertical HPF 231. In FIG. 18, a horizontal axis represents a space frequency, and a vertical axis represents an amplitude. Fs represents a sampling frequency in the vertical direction. The gain adjustment section 232 is adapted to adjust a gain of the high frequency components in the vertical direction extracted in the vertical HPF 231. Also, the horizontal HPF 233 is adapted to extract the high frequency components in the horizontal direction from the input signal Sin. A frequency characteristic of the horizontal HPF 233 is similar to the frequency characteristic illustrated in, for example, FIG. 18. It should be noted in this case that Fs represents a sampling frequency in the horizontal direction. The gain adjustment section 234 is adapted to adjust a gain of the high frequency components in the horizontal direction extracted in the horizontal HPF 233. The adder 235 is adapted to add the input signal Sin with the high frequency components in the vertical direction whose gain has been adjusted in the gain adjustment section 232 and the high frequency components in the horizontal direction whose gain has been adjusted in the gain adjustment section 234 to output an output signal Sout whose high component has been emphasized.

While returning back to FIG. 12, the LCD 204 constitutes a fixed pixel display element. The LCD 204 is adapted to an image based on the synthesized video signal output from the high frequency compensation circuit 203. It should be noted that a fixed pixel display element such as a PDP (Plasma Display Panel) can also be used instead of the LCD 204.

A description will be given of the wipe operation among operations in the image display apparatus 200 illustrated in FIG. 12.

The first video signal Sa which is an interlace signal and the second video signal Sb which is an interlace signal and synchronized with the first video signal Sa are supplied to the selector 201. FIG. 19A illustrates an image displayed on a screen based on the first video signal Sa (input image A), and FIG. 19B illustrates an image displayed on the screen based on the second video signal Sb (input image B).

In addition, the selector 201 is supplied with the wipe switching control signal WS. The wipe switching control signal WS is, as illustrated in FIG. 19C, in one state before the wipe position WP, for example, "0". The wipe switching control signal WS is in the other state after the wipe position WP, for example, "1". In the selector 201, when the wipe switching control signal WS is in the one state, the video signal Sa is taken out and on the other hand, when the wipe switching control signal WS is in the other state, the video signal Sb is taken out. In other words, the synthesized video signal in which the video signals Sa and Sb are switched while corresponding to the wipe position WP is output from the selector 201. FIG. 19D illustrates an image displayed on the screen based on the synthesized video signal (synthesized image).

The synthesized video signal (interlace signal) output from the selector 201 is supplied to the IP conversion circuit 202 and converted from the interlace signal to the progressive signal. Also, the synthesized video signal (progressive signal) output from the IP conversion circuit 202 is supplied to the high frequency compensation circuit 203, and the high frequency components are emphasized. Then, the synthesized video signal output from the high frequency compensation circuit 203 is supplied to the LCD 204. FIG. 19E illustrates an image displayed on the screen of the LCD 204 (output image). That is, on the screen of the LCD 204, the image based on the first video signal Sa is displayed before the wipe position WP, and the image based on the second video signal Sb is displayed after the wipe position WP. When the wipe position WP is shifted from the left to the right, in other words, when the change position from "0" to "1" of the wipe switching control signal WS is delayed, the display area for the image based on the first video signal Sa is larger, and the display area for the image based on the second video signal Sb is smaller.

SUMMARY OF THE INVENTION

In the image display apparatus 200 illustrated in FIG. 12, the first video signal Sa or the second video signal Sb is selectively taken out in the selector 201 based on the wipe switching control signal WS to generate the synthesized video signal, and no gap is generated at the switching position of the images.

However, an IP conversion processing is performed to convert the synthesized video signal (interlace signal) output from the selector 201 in the IP conversion circuit 202 from the interlace signal to the progressive signal, and further the emphasis of the high frequency components is performed in the high frequency compensation circuit 203. For this reason, the image at the switching position is different from an image displayed on a full screen based on the following problems.

A. "Problems from IP Conversion Circuit"

In the IP conversion circuit 202, as described above, the motion determination circuit 223 determines whether this display is the motion picture or the still image by using the current field signal and the past field signal in units of pixel. Then, in the IP conversion circuit 202, as described above, when it is determined that this display is the motion picture in the motion determination circuit 223, the interpolation signals generated in the interpolation signal generation circuit 221 through the diagonal interpolation or the vertical interpolation are used. Problems from the IP conversion circuit 202 include (1) problems from the diagonal interpolation and (2) problems from the motion determination.

First, a description will be given of (1) problems from the diagonal interpolation. The problems from the diagonal interpolation are described with reference to FIGS. 20A to 20D.

FIG. 20A illustrates the left image before the synthesis based on the first video signal Sa (interlace signal) and a magnified part of the left image at the wipe position WP (a range surrounded by a broken line). Also, FIG. 20B illustrates the right image before the synthesis based on the second video signal Sb (interlace signal) and a magnified part of the right image at the wipe position WP (a range surrounded by a broken line). the left image is an image depicting the diagonal line, and the right image is a flat image. The wipe position WP is located at the center of the screen in the horizontal direction. It should be noted that state of the respective pixels illustrated in the magnified view corresponds to the signal at the relevant pixel (interlace signal). This applies the same to the subsequent corresponding drawings.

FIG. 20C illustrates the synthesized image based on the synthesized video signal (interlace signal) output from the selector 201, and a magnified part of the synthesized image at the wipe position WP (a range surrounded by a broken line). With regard to this synthesized image, the wipe position WP functions as the image switching position. The left image is displayed before the wipe position WP (on the left hand side) and on the other hand, the right image displayed after the wipe position WP (on the right hand side).

A consideration will be given of the case where the diagonal interpolation is carried out on the synthesized image illustrated in FIG. 20C (synthesized video signal). In the case of the diagonal interpolation, as described above, a correlativity in the diagonal direction is determined. When it is determined that the collation exists in the diagonal direction at a certain angle, signals at the upper and lower pixels in the diagonal direction are averaged to generate interpolation pixel signals. When the diagonal line is cut by the wipe position WP, the collation does not exist in the diagonal direction with regard to the cut position of the diagonal line. For this reason, with regard to the cut position of the diagonal line, interpolation pixel signals are generated through the vertical interpolation as illustrated in FIG. 20D.

For example, in the case of the left image on the full screen, as illustrated in FIG. 14B described above, the smooth interpolation is carried out through the diagonal interpolation. Therefore, between at the time of the wipe operation and at the time of the full screen display, different images are observed at the switching position for the images (the wipe position WP).

In this manner, in the image display apparatus 200 illustrated in FIG. 12, the above-mentioned problems from the diagonal interpolation exist. Therefore, in the wipe operation, there is an inconvenience that it may be impossible to compare the images with precision because the precise images are not displayed at the switching position for the images (the wipe position WP).

Next, a description will be given of (2) problems from motion determination. The problems from the motion determination are described with reference to FIGS. 21A to 21G.

FIG. 21A illustrates a magnified part of the first video signal Sa (interlace signal) at the wipe position WP. Also, FIG. 21B illustrates a magnified part of the right image before the synthesis based on the second video signal Sb (interlace signal) at the wipe position WP. The left image is an image depicting the diagonal line on which the motion determination is carried out. In contrast to this, the right image is an image depicting the diagonal line on which the still image determination is carried out.

FIG. 21C illustrates a magnified part of the synthesized image based on the synthesized video signal (interlace signal) output from the selector 201 at the wipe position WP. With regard to this synthesized image, the wipe position WP functions as the image switching position. The left image is displayed before the wipe position WP (on the left hand side) and on the other hand, the right image displayed after the wipe position WP (on the right hand side).

In general, when the motion determination is carried out, a visually stable interpolation result is aimed to be obtained. When the motion determination result of the target pixel is different from a motion determination result in the vicinity of the pixel, the motion determination including information on the motion determination result in the vicinity of the pixel is carried out. For this reason, in the case of the synthesized image illustrated in FIG. 21C, the motion determination is carried out in the state of the motion picture on the left hand side of the wipe position WP and in the state of the still image on the right hand side of the wipe position WP. In the motion determination result, as the motion picture determination area is hatched, which is illustrated in FIG. 21C, a part of the still image part is turned into the motion picture part beyond the wipe position WP.

For that reason, in a case where the interpolation signal generation circuit 221 of the IP conversion circuit 202 generates the interpolation signals through the diagonal interpolation, the image after the IP conversion is, as illustrated in FIG. 21D, different from an expected result illustrated in FIG. 21E, and between at the time of the wipe operation and at the time of the full screen display, different images are observed at the switching position for the images (the wipe position WP).

Also, similarly, in a case where the interpolation signal generation circuit 221 of the IP conversion circuit 202 generates the interpolation signals through the vertical interpolation, the image after the IP conversion is, as illustrated in FIG. 21F, different from an expected result illustrated in FIG. 21G, and between at the time of the wipe operation and at the time of the full screen display, different images are observed at the switching position for the images (the wipe position WP).

In this manner, as the image display apparatus 200 illustrated in FIG. 12 has the above-mentioned problems from the motion determination, in the wipe operation, there is an inconvenience that it may be impossible to compare the images with precision because the precise images are not displayed at the switching position for the images (the wipe position WP).

B. "Problems from High Frequency Compensation"

In the high frequency compensation circuit 203, as described above, the high frequency components of the synthesized video signal (progressive signal) output from the IP conversion circuit 202 are emphasized. FIG. 22 illustrates a waveform example of the line N in the synthesized video signal which is output from the high frequency compensation circuit 203. In this manner, the waveform of the line N drastically changes at the wipe position WP, and as illustrated in the drawing, ringings are generated while corresponding to the wipe position WP. The ringings are components which do not exist in the video signals before the synthesis, and between at the time of the wipe operation and at the time of the full screen display, different images are observed at the switching position for the images (the wipe position WP).

In this manner, as the image display apparatus 200 illustrated in FIG. 12 has the above-mentioned problems from the high frequency compensation circuit 203, in the wipe operation, there is an inconvenience that it may be impossible to compare the images with precision because the precise images are not displayed at the switching position for the images (the wipe position WP).

According to an embodiment of the present invention, it is desirable to prevent a gap from generating at a switching position for images and also desirable to display the images at the switching position as the identical images on a full screen.

A concept of the embodiment of the present invention relates to a video signal processing apparatus including: a video signal synthesis section adapted to, when with respect to a border position dividing a screen in one of a horizontal direction and a vertical direction, a position after the border position by a predetermined length is set as a first position and a position before the border position by a predetermined length is set as a second position, take out a first main area part corresponding to a part before the border position of the screen and a first border area part corresponding to a part from the border position to the first position of the screen from a first video signal and also take out a second border area part corresponding to a part from the second position to the border position of the screen and a second main area part corresponding to a part after the border position of the screen from a second video signal to synthesize the signals; an image processing section adapted to perform a predetermined image processing on a synthesized video signal output from the video signal synthesis section; and a video signal output section adapted to remove the first border area part and the second border area part from the synthesized video signal output from the image processing section to obtain an output video signal.

According to another embodiment of the present invention, in the video signal synthesis section, with respect to the border position dividing the screen in one of the horizontal direction and the vertical direction, the position after the border position by a predetermined length is set as the first position and the position before the border position by a predetermined length is set as the second position. At this time, the border position corresponds to a wipe position functioning as a switching position for the images when, for example, the wipe operation is carried out. Then, in the video signal synthesis section, the first main area part corresponding to the part before the border position of the screen and the first border area part corresponding to the part from the border position to the first position of the screen are taken out from the first video signal and also the second border area part corresponding to the part from the second position to the border position of the screen and the second main area part corresponding to the part after the border position of the screen are taken out from the second video signal to synthesize the signals.

This video signal synthesis section, for example, includes a first delay circuit adapted to delay the second video signal by a first period of time corresponding to a predetermined number of pixels in one of the horizontal direction and the vertical direction, and a first selector adapted to selectively take out, when a position after a second period of time which is half of the first period of time from the border position is set as a first reference position with respect to the first video signal, based on a first switching control signal which is in one state before the first reference position and is in the other state after the first reference position, the first video signal or the second video signal output from the first delay circuit, and the first selector may take out the first video signal when the first switching control signal is in the one state and take out the second video signal output from the first delay circuit when the first switching control signal is in the other state.

In the image processing section, a predetermined image processing may be performed on the synthesized video signal output from the video signal synthesis section. At this time, the predetermined image processing refers to, for example, such a processing that the processing result at the switching position for the synthesized video signal is different from the processing result when no video signal switching is carried out.

For example, when the first and the second video signals are interlace signals, the image processing section includes a conversion circuit adapted to convert the interlace signal to a progressive signal. It should be noted that this conversion circuit includes, for example, a motion determination section adapted to determine whether this display is a motion picture or a still image based on the interlace signal, and an interpolation signal generation section adapted to generate an interpolation signal from the interlace signal in accordance with a determination result of the motion determination section. The interpolation signal generation section may generate the interpolation signal by using a signal in the same field through one of a diagonal interpolation and a vertical interpolation when the motion determination section determines that this display is the motion picture. Also, for example, the image processing section includes a high frequency compensation circuit adapted to emphasize a high frequency component of the video signal.

In the video signal output section, the first border area and the second border area are removed from the synthesized video signal which is output from the image processing section to obtain the output video signal.

This video signal output section includes, for example, a second delay circuit adapted to delay the synthesized video signal output from the image processing section by the first period of time, and a second selector adapted to selectively take out, when with respect to the synthesized video signal output from the image processing section, a position after the second period of time from a switching position between the first video signal and the second video signal is set as a second reference position, based on a second switching control signal which is in one state before the second reference position and is in the other state after the second reference position, the synthesized video signal output from the image processing section or the synthesized video signal output from the second delay circuit, and the second selector may take out the synthesized video signal output from the second delay circuit when the second switching control signal is in the one state and take out the synthesized video signal output from the image processing section when the second switching control signal is in the other state.

The output video signal obtained in the video signal output is supplied to, for example, an image display element such as a LCD or a PDP. On this image display element, with respect to the border position dividing the screen in the horizontal direction or the vertical direction, an image based on the first video signal may be displayed before the border position and an image based on the second video signal may be displayed after the border position.

In this manner, according to the embodiment of the present invention, the main area parts (the first and second main area parts) contributing to the actual image display and also the border area parts (the first and second border area parts) are taken out from the first and second video signals to generate the synthesized video signal, the predetermined image processing is performed on this synthesized video signal, and thereafter the output video signal is obtained by removing the border area parts, whereby no gap is generated at the image switching position, and also the images at the switching position are displayed as the identical images on a full screen. In this sequence, for example, in the wipe operation, the precise image is displayed at the image switching position (the wipe position WP), and it is possible to perform a precise comparison between the two images.

According to the embodiment of the present invention, the main area parts contributing to the actual image display and also the border area parts are taken out from the first and second video signals to generate the synthesized video signal, the predetermined image processing is performed on this synthesized video signal, and thereafter the output video signal is obtained by removing the border area parts, whereby no gap is generated at the image switching position, and also the image at the switching position can be displayed as the identical images on the full screen.

BRIEF DESCRIPTION OF THE DRAWINGS

FIG. 1 is a block diagram of a configuration example of an image display apparatus according to an embodiment of the present invention;

FIGS. 4A to 4K are drawings for describing a wipe operation in the image display apparatus;

FIGS. 5A to 5E are drawings for describing solutions for problems from a diagonal interpolation;

FIGS. 6A to 6F are drawings for describing solutions for problems from a motion determination;

FIGS. 7A to 7F are drawings for describing the solutions for problems from the motion determination;

FIG. 13 is a block diagram of a configuration example of an IP conversion circuit;

FIGS. 20A to 20D are drawings for describing problems from the diagonal interpolation in the related art image display apparatus;

FIGS. 21A to 21G are drawings for describing problems from the motion determination in the related art image display apparatus.

DESCRIPTION OF THE PREFERRED EMBODIMENTS

Figure 2A:
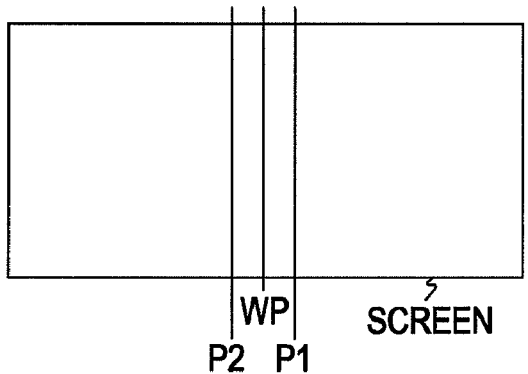
FIG. 2 is a drawing for describing a processing procedure in a video signal synthesis section in the image display apparatus.

Hereinafter, with reference to the drawings, embodiments of this invention will be described. FIG. 1 illustrates a configuration example of an image display apparatus 100 according to an embodiment of the present invention. The image display apparatus 100 is provided with a selector 101, delay circuits 102 and 103, an IP conversion circuit 104, a high frequency compensation circuit 105, a selector 106, delay circuits 107 and 108, and a LCD (Liquid Crystal Display) 109.

A first video signal Sa is input to the selector 101. The delay circuit 102 has a delay time of 2×DT while a period of time corresponding to a predetermined number of pixels in the horizontal direction, for example, 5 pixels is set as DT. At this time, 2×DT constitutes a first delay time. A second video signal Sb which is synchronized with the above-mentioned first video signal Sa is delayed by 2×DT in the delay circuit 102 and input to the selector 101. The delay circuit 102 constitutes a first delay circuit.

The delay circuit 103 has a delay time of DT. At this time, DT constitutes a second delay time. The selector 101 is supplied with a switching control signal WS1$d$ which is obtained while a wipe switching control signal WS1 is delayed by DT in the delay circuit 103. With respect to the first video signal Sa, the wipe switching control signal WS1 is in one state before a wipe position (border position) WP horizontally dividing the screen, for example, "0", and is in the other state, for example, "1".

The switching control signal WS1d constitutes a first switching control signal. When a position after the wipe position WP by DT is set as a first reference position, with respect to the first video signal Sa, the switching control signal WS1d is in one state before the first reference position, for example, "0", and is in the other state after the first reference position, for example, "1".

The selector 101 is adapted to selectively take out the video signal Sa or the video signal Sb based on the switching control signal WS1d to generate a synthesized video signal. That is, the selector 101 takes out the video signal Sa when the switching control signal WS1d is in the one state. On the other hand, when the switching control signal WS1d is in the other state, the selector 101 takes out the video signal Sb from the delay circuit 102.

Herein, the selector 101, the delay circuit 102, and the delay circuit 103 constitutes a video signal synthesis section. As illustrated in FIG. 2A, with respect to a wipe position (border position) WP dividing a screen in the horizontal direction, a position after the wipe position WP by a predetermined length, for example, 5 pixels in this embodiment, is set as a first position P1 and a position before the wipe position WP by a predetermined length, for example, 5 pixels in this embodiment, is set as a second position P2.

Figure 2B:
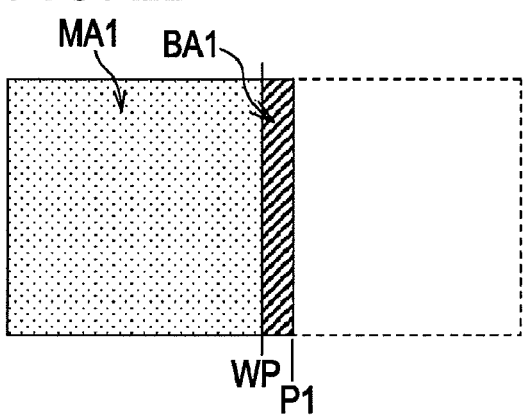
Figure 2C:
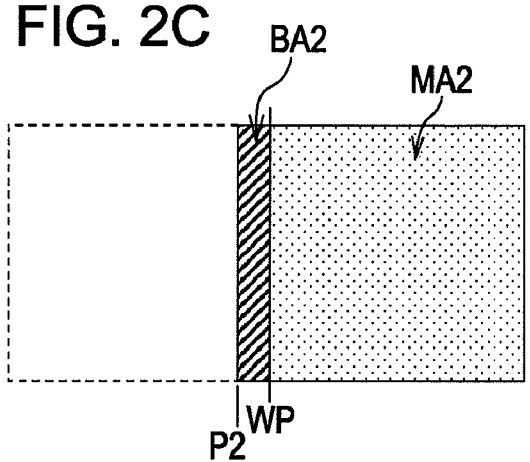
Figure 2D:
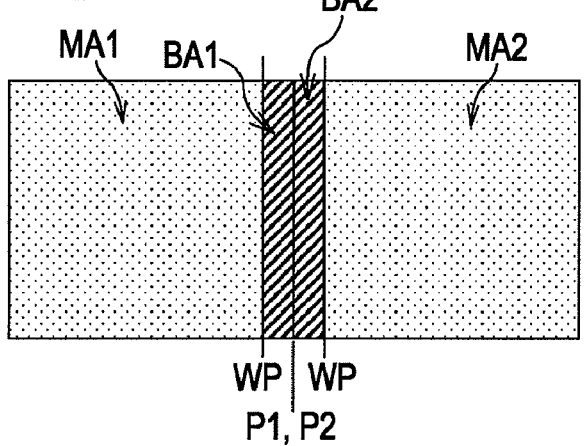

The video signal synthesis section is adapted to take out, from the first video signal Sa, as illustrated in FIG. 2B, a first main area part MA1 corresponding to a part before the wipe position WP of the screen and a first border area part BA1 corresponding to a part from the wipe position WP to the first position P1. Also, the video signal synthesis section is adapted to take out, from the second video signal Sb, as illustrated in FIG. 2C, a second border area part BA2 corresponding to a part from the second position P2 of the screen to the wipe position WP and a second main area part MA2 corresponding to a part after the wipe position WP. Then, the video signal synthesis section is adapted to synthesize, as illustrated in FIG. 2D, the first main area part MA1 and the first border area part BA1 taken out from the first video signal Sa with the second border area part BA2 and the second main area part MA2 taken out from the second video signal Sb to generate a synthesized video signal.

Figure 12:
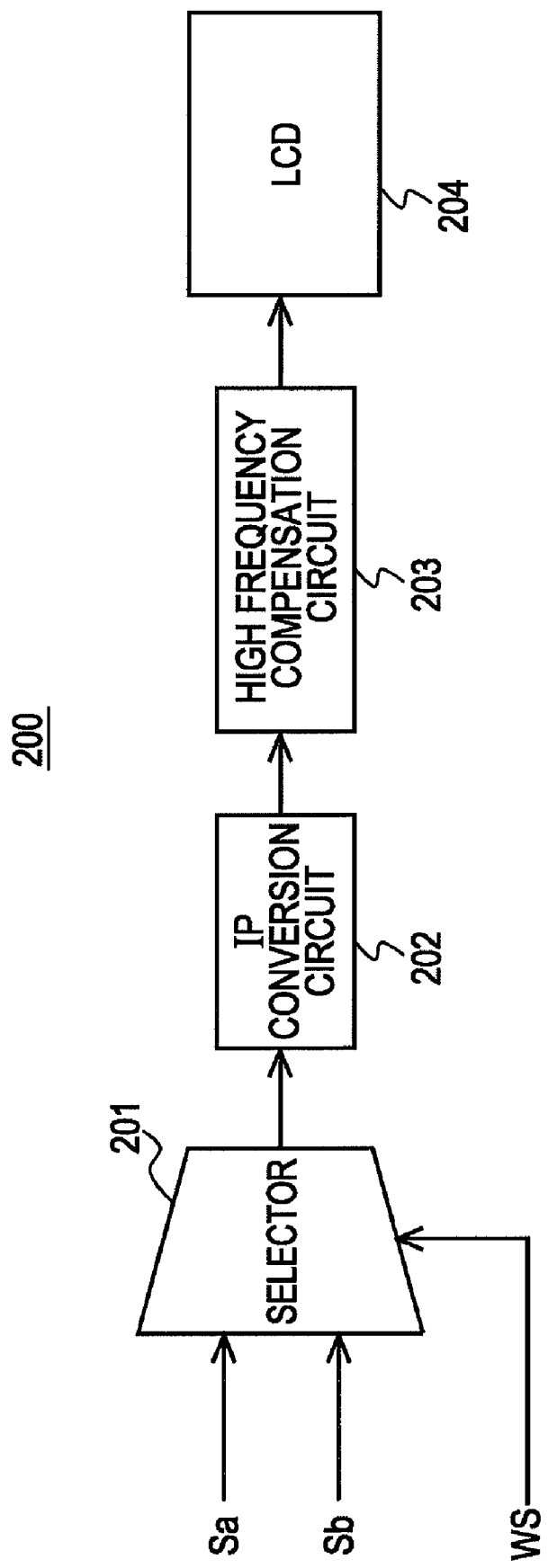
FIG. 12 is a block diagram of a configuration example of an image display apparatus having a related art wipe operation.
Figure 14A:
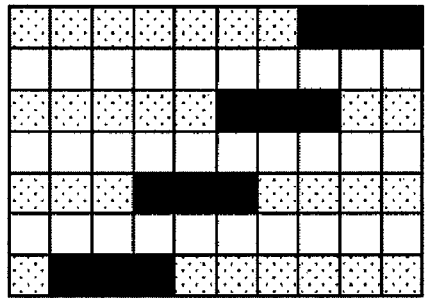
FIGS. 14A to 14C illustrate examples of an interlace signal, a progressive signal based on a diagonal interpolation, and a progressive signal based on a vertical interpolation.
Figure 14B:
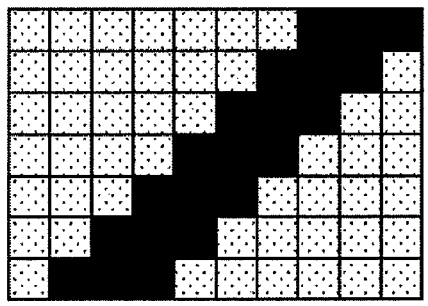
Figure 14C:
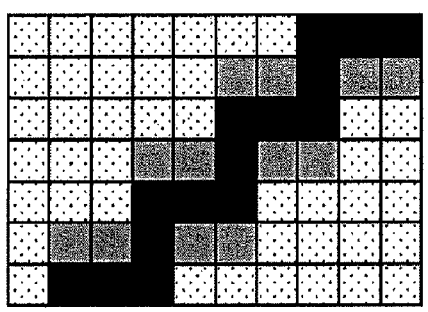
Figure 15A:
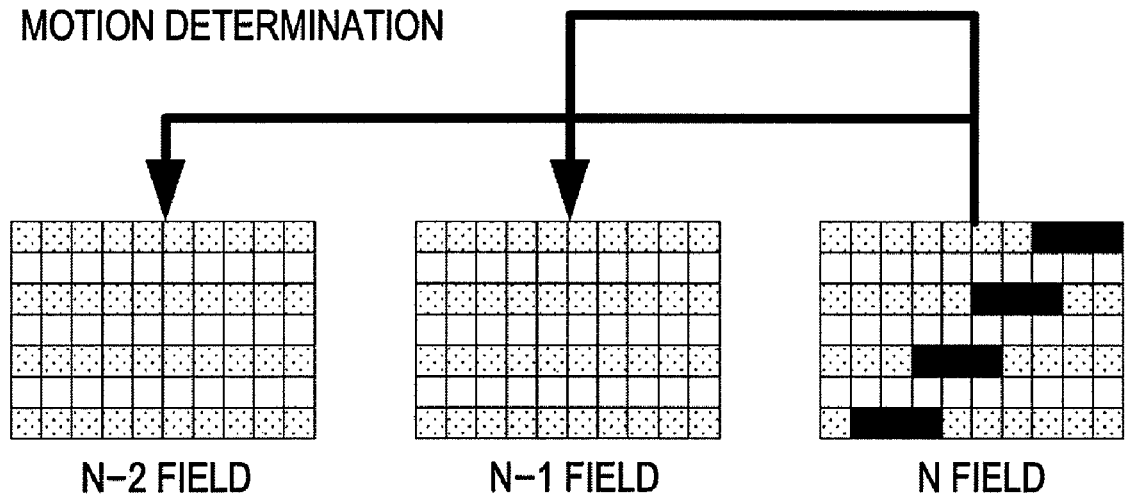
FIGS. 15A to 15C illustrate examples of motion determination in a motion determination circuit (in the case of motion picture determination) and progressive signals generated in that case.
Figure 15B:
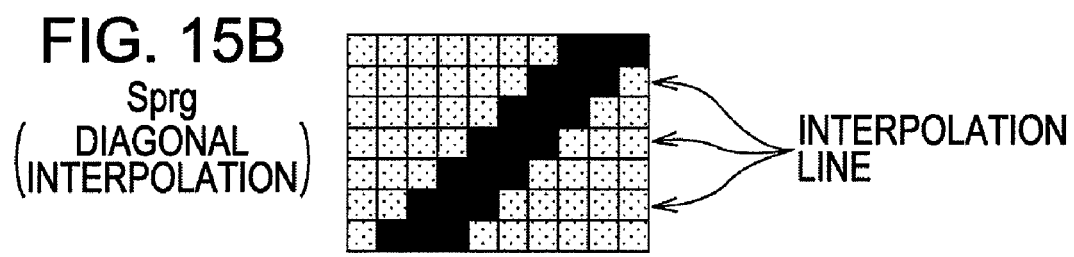
Figure 15C:
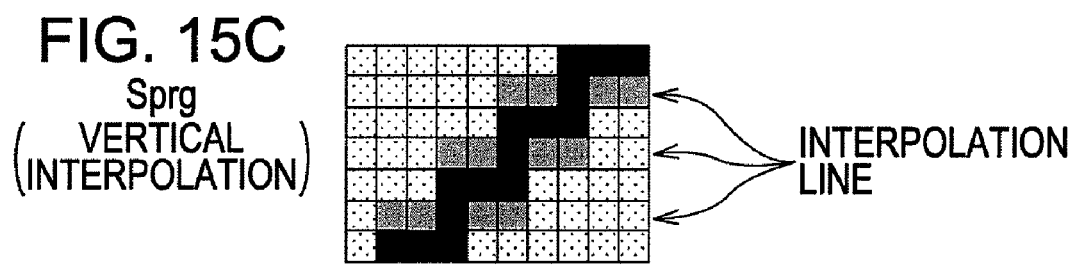
Figure 16A:
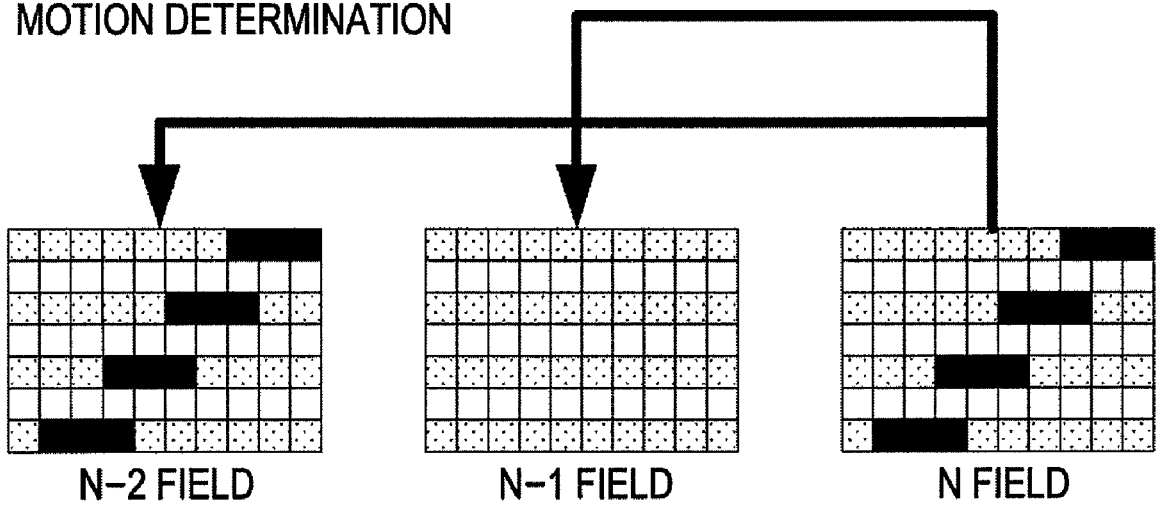
FIGS. 16A and 16B illustrate examples of motion determination in the motion determination circuit (in the case of still image determination) and progressive signals generated in that case.
Figure 16B:
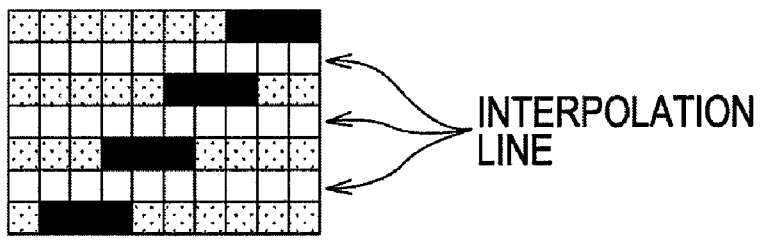

The IP conversion circuit 104 is adapted to convert the synthesized video signal obtained in the selector 101 from the interlace signal to the progressive signal. Although a detail description is omitted, the IP conversion circuit 104 has a similar configuration to that of the IP conversion circuit 202 in the above-mentioned image display apparatus 200 illustrated in FIG. 12 (refer to FIG. 13). The IP conversion circuit 202 has a motion determination section adapted to determine whether this display is a motion picture or a still image in units of pixel based on the synthesized video signal (interlace signal) which is output from the selector 101. In accordance with the determination result of this motion determination section, interpolation signals (interpolation line signals) are generated through a diagonal interpolation or a vertical interpolation in an interpolation signal generation section.

Figure 17:
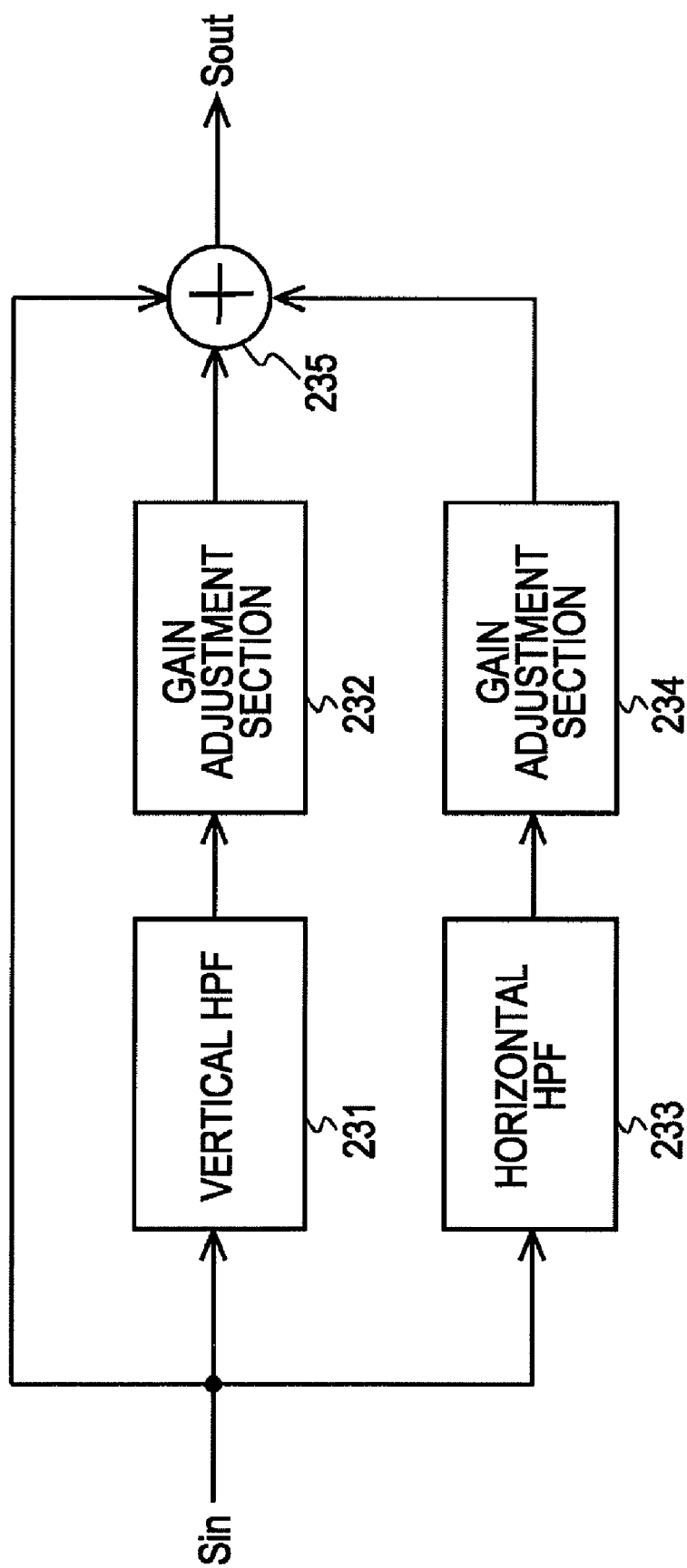
FIG. 17 is a block diagram of a configuration example of the high frequency compensation circuit.
Figure 18:
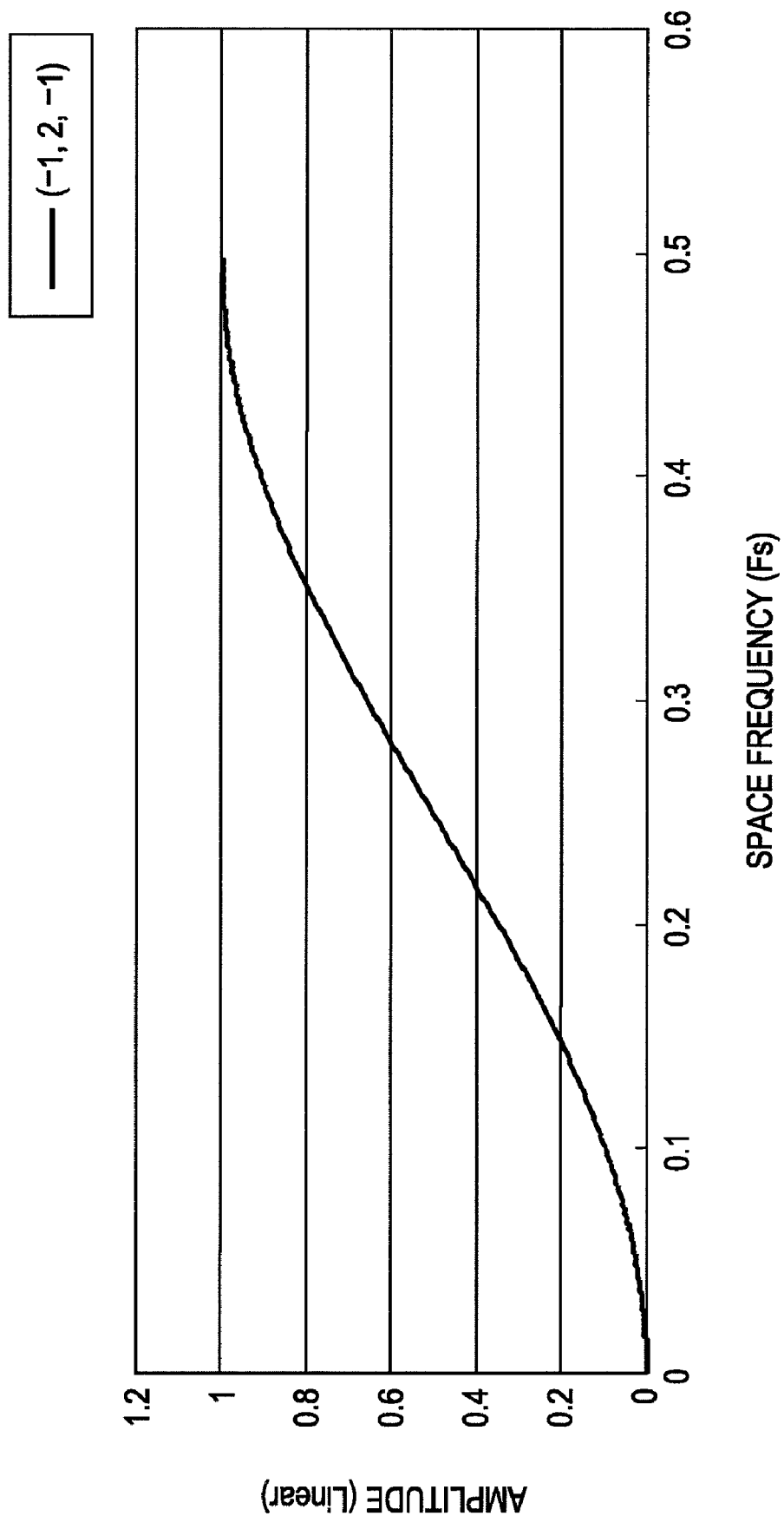
FIG. 18 illustrates an example of a frequency characteristic of a high frequency compensation high pass filter.
Figure 19A:
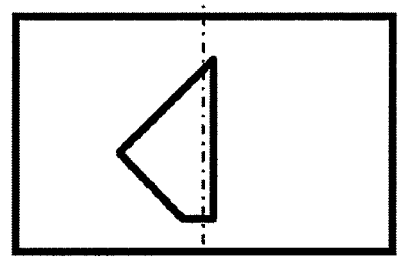
FIGS. 19A to 19E are drawings for describing the wipe operation in the related art image display apparatus.
Figure 19B:
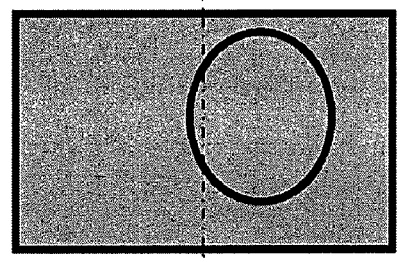
Figure 19C:
Figure 19D:
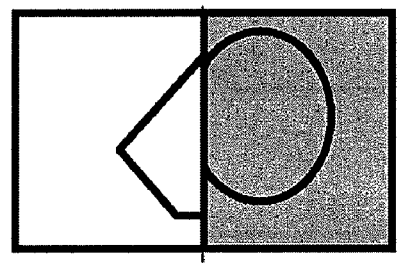
Figure 19E:
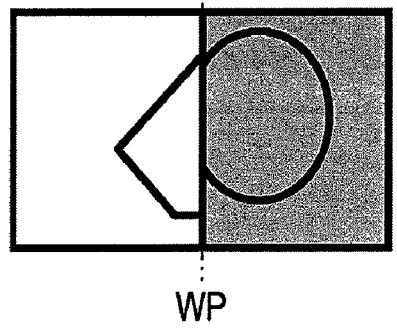

The high frequency compensation circuit 105 is adapted to emphasize high frequency components of the synthesized video signal (progressive signal) output from the IP conversion circuit 104. Although a detailed description is omitted, the high frequency compensation circuit 105 has a similar configuration to that for the above-mentioned high frequency compensation circuit 203 in the image display apparatus 200 illustrated in FIG. 12 (refer to FIG. 17).

The synthesized video signal (progressive signal) which is output from the high frequency compensation circuit 105 is input to the selector 106. The delay circuit 107 has the delay time of 2×DT. The synthesized video signal (progressive signal) output from the high frequency compensation circuit 105 is delayed by 2×DT in the delay circuit 107 and input to the selector 106. The delay circuit 107 constitutes a second delay circuit.

The delay circuit 108 has the delay time of DT. The selector 106 is supplied with a switching control signal WS2d which is obtained while a wipe switching control signal WS2 is delayed by DT in the delay circuit 108. With respect to the synthesized video signal output from the high frequency compensation circuit 105, the wipe switching control signal WS2 is in one state before a switching position between the first video signal Sa and the second video signal Sb, for example, "0" and the wipe switching control signal WS2 is in the other state after the switching position, for example, "1".

The switching control signal WS2d constitutes a second switching control signal. With respect to the synthesized video signal output from the high frequency compensation circuit 105, when a position after the above-mentioned switching position between the video signals Sa and Sb by DT is set as a second reference position, the switching control signal WS2d is in one state before the second reference position, for example, "0" and the switching control signal WS2d is in the other state after the second reference position, for example, "1".

The selector 106 is adapted to selectively take out the synthesized video signal output from the high frequency compensation circuit 105 or the synthesized video signal output from the delay circuit 107 based on the switching control signal WS2d. That is, when the switching control signal WS2d is in the one state, the selector 106 takes out the synthesized video signal output from the delay circuit 107. On the other hand, when the switching control signal WS2d is in the other state, the selector 106 takes out the synthesized video signal output from the high frequency compensation circuit 105.

Figure 3A:
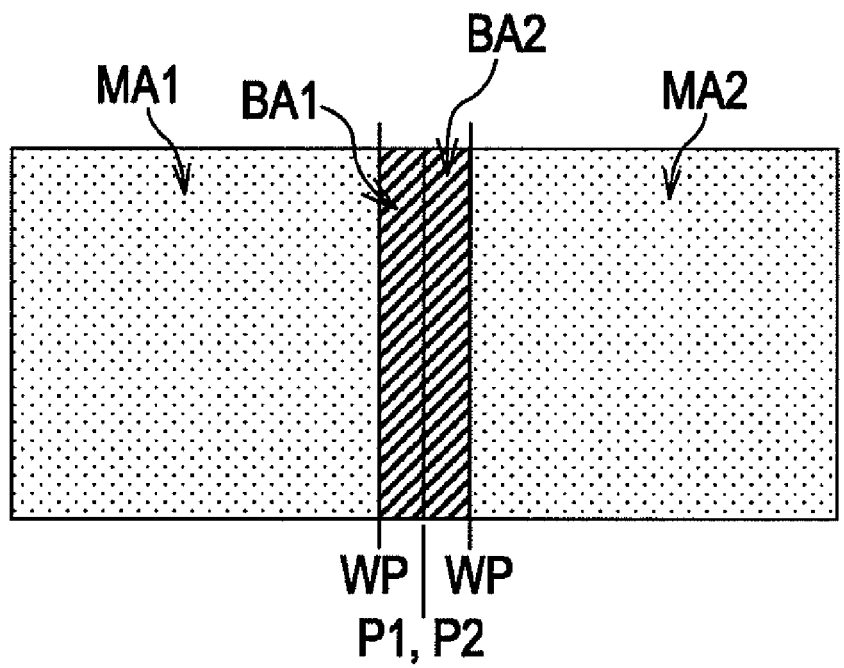
FIGS. 3A and 3B are drawings for describing a processing procedure in a video signal output section in the image display apparatus.
Figure 3B:
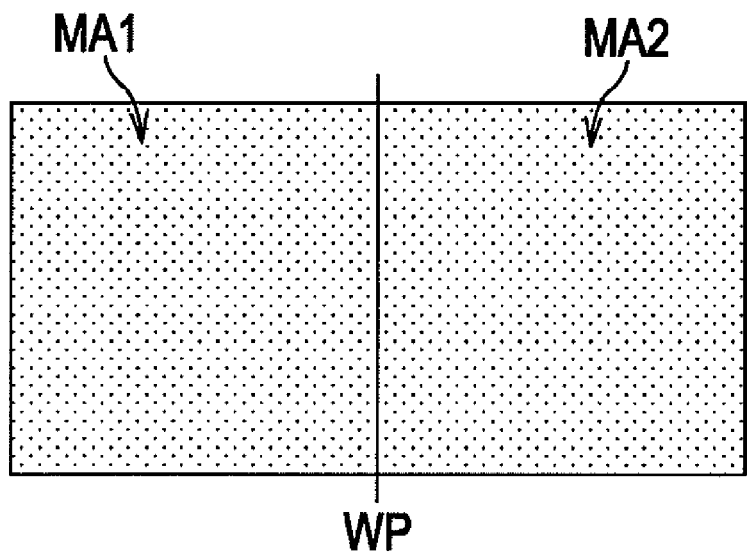

Herein, the selector 106, the delay circuit 107 and the delay circuit 108 constitute a video signal output section. The synthesized video signal output from the high frequency compensation circuit 105 is obtained by synthesizing, as illustrated in FIG. 3A, the first main area part MA1 and the first border area part BA1 which are taken out from the first video signal Sa with the second border area part BA2 and the second main area part MA2 which are taken out from the second video signal Sb (refer to FIG. 2D). The video signal output section is adapted to remove, as illustrated in FIG. 3B, the synthesized video signal output from the high frequency compensation circuit 105 from the first border area part BA1 and the second border area part BA2, in other words, takes out the synthesized video signal output from the high frequency compensation circuit 105 from the first main area part MA1 and the second main area part MA2 to obtain an output video signal.

The LCD 109 constitutes a pixel display element. The LCD 109 displays an image based on the output video signal output from the selector 106 (synthesized video signal). It should be noted that instead of the LCD 109, a configuration may adopt another pixel display element such as PDP.

A wipe operation in operations in the image display apparatus 100 illustrated in FIG. 1 will be described.

The first video signal Sa which is an interlace signal is supplied to the selector 101, and also the second video signal Sb which is an interlace signal and synchronized with the first video signal Sa is delayed in the delay circuit 102 by 2×DT and supplied to the selector 101. FIG. 4A illustrates an image based on the first video signal Sa which is displayed on the screen (input image A). FIG. 4B illustrates an image based on the second video signal Sb which is displayed on the screen (input image B). Furthermore, FIG. 4C illustrates an image based on the second video signal Sb delayed by 2×DT which is displayed on the screen (input image Bd).

In addition, the wipe switching control signal WS1 is supplied to the delay circuit 103 having the delay time of DT, and the switching control signal WS1*d* output from the delay circuit 103 is supplied to the selector 101. As illustrated in FIG. 4D, with respect to the first video signal Sa (refer to the input image A of FIG. 4A), the wipe switching control signal WS1 is in one state before the wipe position WP, for example, "0", and the wipe switching control signal WS1 is in the other state after the wipe position WP, for example, "1". Then, as illustrated in FIG. 4E, with respect to the first video signal Sa (refer to the input image A of FIG. 4A), when a position after the wipe position WP by DT is set as the first reference position, the switching control signal WS1*d* is in one state before the first reference position, for example, "0", and the switching control signal WS1*d* is in one state after the first reference position, for example, "1".

In the selector 101, when the switching control signal WS1*d* is in the one state, the video signal Sa (refer to FIG. 4A) is taken out and on the other hand, when the switching control signal WS1*d* is in the other state, the video signal Sb output from the delay circuit 102 is taken out (refer to FIG. 4C) to generate the synthesized video signal. FIG. 4F illustrates an image based on the synthesized video signal generated in the selector 101 which is displayed on the screen (synthesized image).

As illustrated in FIG. 4F, the synthesized video signal obtained in the selector 101 is obtained by synthesizing the first main area part MA1 and the first border area part BA1 which are taken out from the first video signal Sa with the second border area part BA2 and the second main area part MA2 which are taken out from the second video signal Sb. At this time, the first main area part MA1 corresponds to a part before the wipe position WP of the screen, and the first border area part BA1 corresponds to a part from the wipe position WP of the screen to the first position P1 which is after the wipe position WP by DT. Also, the second border area part BA2 corresponds to a part from the second position P2 which is before the wipe position WP of the screen by DT to the wipe position WP, and the second main area part MA2 corresponds to a part after the wipe position WP of the screen.

The synthesized video signal (interlace signal) which is output from the selector 101 is supplied to the IP conversion circuit 104 and converted from the interlace signal to the progressive signal. Also, the synthesized video signal output from the IP conversion circuit 104 (progressive signal) is supplied to a high frequency conversion circuit 105, and high frequency components of the synthesized video signal are emphasized. FIG. 4G illustrates an image based on the synthesized video signal output from the high frequency compensation circuit 105 which is displayed on the screen (output image C). The synthesized video signal output from the high frequency compensation circuit 105 is obtained by synthesizing, as illustrated in FIG. 4G, the first main area part MA1 and the first border area part BA1 which are taken out from the first video signal Sa with the second border area part BA2 and the second main area part MA2 which are taken out from the second video signal Sb.

The synthesized video signal output from the high frequency compensation circuit 105 is supplied to the selector 106. Also, the synthesized video signal output from the high frequency compensation circuit 105 is delayed in the delay circuit 107 by 2×DT and supplied to the selector 106. FIG. 4H illustrates an image based on the synthesized video signal delayed by 2×DT which is displayed on the screen (output image Cd).

Also, the wipe switching control signal WS2 is supplied to the delay circuit 108 having the delay time of DT, and the switching control signal WS2*d* output from the delay circuit 108 is supplied to the selector 106. As illustrated in FIG. 4I, with respect to the synthesized video signal output from the high frequency compensation circuit 105, the wipe switching control signal WS2 is in one state before the switching position between the first video signal Sa and the second video signal Sb, for example, "0" and the wipe switching control signal WS2 is in the other state after the switching position, for example, "1".

Then, as illustrated in FIG. 4J, when a position after the above-mentioned switching position between the video signals Sa and Sb by DT is set as the second reference position, the switching control signal WS2*d* is in one state before the second reference position, for example, "0", and the switching control signal WS2*d* is in the other state after the second reference position, for example, "1".

In the selector 106, when the switching control signal WS2*d* is in the one state, the synthesized video signal (refer to FIG. 4H) output from the delay circuit 107 is taken out. On the other hand, when the switching control signal WS2*d* is in the other state, the synthesized video signal (refer to FIG. 4G) output from the high frequency compensation circuit 105 is taken out, and an output video signal is obtained. FIG. 4K illustrates an image based on the output video signal output from the selector 106 which is displayed on the screen (output image D).

The output video signal output from the selector 106 is obtained by removing, as illustrated in FIG. 4K, the first border area part BA1 and the second border area part BA2 from the synthesized video signal output from the high frequency compensation circuit 105 (refer to FIG. 4G), in other words, taking out the first main area part MA1 and the second main area part MA2 from the synthesized video signal output from the high frequency compensation circuit 105.

The output video signal output from the selector 106 is supplied to the LCD 109. The output image illustrated in FIG. 4K is also an image displayed on a screen of the LCD 204. That is, on the screen of the LCD 109, the image based on the first video signal Sa is displayed before the wipe position WP, and the image based on the second video signal Sb is displayed after the wipe position WP. When the wipe position WP is shifted from the left to the right, in other words, when the change position of the wipe switching control signals WS1 and WS2 from "0" to "1" is delayed, the display area for the image based on the first video signal Sa is larger, and the display area for the image based on the second video signal Sb is smaller.

As described above, in the image display apparatus 100 illustrated in FIG. 1, the first and second main area part MA1 and MA2 contributing to the actual image display and the adjacent first and second border area parts BA1 and BA2 are taken out from the first and second video signals Sa and Sb, and the synthesized video signal is generated in the selector 101. In the IP conversion circuit 104 and the high frequency compensation circuit 105, a processing is carried out on the synthesized video signal generated in the selector 101. Then, the selector 106, the first and second border area parts BA1 and BA2 are removed the synthesized video signal after the processing to obtain an output video signal composed of the first and second main area part MA1 and MA2.

Therefore, in an image based on the output video signal obtained in the selector 106, no gap is generated at the switching position between the images based on the first and second video signals Sa and Sb. Also, the images at the switching position are displayed as the identical images on the full screen. In this sequence, for example, in the wipe operation, the precise images are displayed at the switching position for the images (the wipe position WP), and it is possible to perform a precise comparison between the two images.

Figure 22:
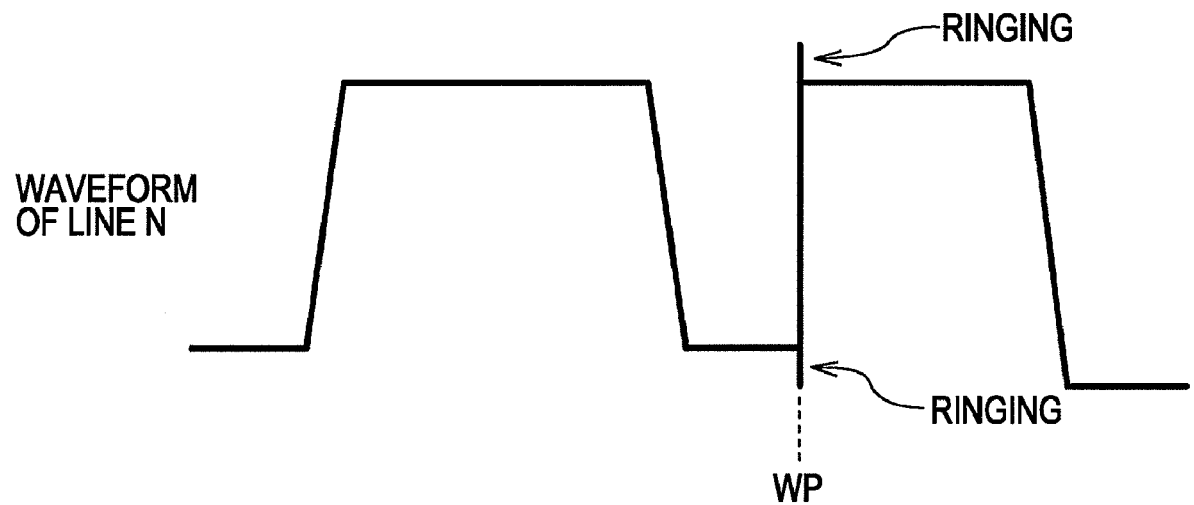
FIG. 22 is a drawing for describing problems from the high frequency compensation circuit in the related art image display apparatus.

Hereinafter, a phenomenon in which the problems from the IP conversion circuit in the image display apparatus 200 in the related art (refer to FIGS. 20A to 20D and FIGS. 21A to 21G) and the problems from the high frequency compensation circuit (refer to FIG. 22) are solved in the image display apparatus 100 illustrated in FIG. 1 will be described.

AA. "Solutions for Problems from IP Conversion Circuit"

(1) Solutions for problems from a diagonal interpolation will be described with reference to FIGS. 5A to 5E.

FIG. 5A illustrates the left image before the synthesis based on the first video signal Sa (interlace signal) and a magnified part of the left image at the wipe position WP (a range surrounded by a broken line). In this left image, the first main area part MA1 corresponding to a part before the wipe position WP exists, and the first border area part BA1 corresponding to a part from the wipe position WP to the first position P1 exists.

Then, FIG. 5B illustrates the right image before the synthesis based on the second video signal Sb (interlace signal) and a magnified part of the right image at the wipe position WP (a range surrounded by a broken line). In this right image, the second border area part BA2 from the second position P2 to the wipe position WP exists, and the second main area part MA2 corresponding to a part after the wipe position WP exists.

It should be noted that the left image is an image depicting the diagonal line, and the right image is a flat image. The wipe position WP is located at the center of the screen in the horizontal direction. The state of the respective pixels illustrated in the magnified view corresponds to the signal at the relevant pixel (interlace signal). This applies the same to the subsequent corresponding drawings.

FIG. 5C illustrates the synthesized image based on the synthesized video signal (interlace signal) which is output from the selector 101, and a magnified part of the synthesized image at the wipe position WP (a range surrounded by a broken line). This synthesized image is composed of the first main area part MA1, the first border area part BA1, the second border area part BA2, and the second main area part MA2. That is, this synthesized image is obtained by taking out the part before the first position P1 from the left image illustrated in FIG. 5A and taking out the part after the second position P2 from the right image illustrated in FIG. 5B.

A consideration will be given of the case where the diagonal interpolation is carried out on the synthesized image illustrated in FIG. 5C (synthesized video signal). In the case of the diagonal interpolation, as described above, a correlativity in the diagonal direction is determined. When it is determined that the collation exists in the diagonal direction at a certain angle, signals at the upper and lower pixels in the diagonal direction are averaged to generate interpolation pixel signals. FIG. 5D illustrates the image after the IP conversion (the image converted from the interlace signal to the progressive signal). In this case, as the diagonal line is not cut off at the wipe position WP, the smooth interpolation is carried out through the diagonal interpolation at the wipe position WP.

FIG. 5E illustrates the synthesized image based on the synthesized video signal (progressive signal) output from the selector 106, in other words, the image after removing the first border area part BA1 and the second border area part BA2, and a magnified part of the synthesized image at the wipe position WP (a range surrounded by a broken line). As described above, the IP conversion processing is performed in the state where the image is not cut off at the wipe position WP, and the smooth interpolation is carried out through the diagonal interpolation at the wipe position WP. As illustrated in FIG. 5E, the images after the border area parts BA1 and BA2 are removed obtain the identical images as being displayed on the full screen at the image switching position (the wipe position WP).

(2) Solutions for problems from the motion determination will be described. First, with reference to FIGS. 6A to 6F, a case where the interpolation signals for the motion picture are generated through the diagonal interpolation is described.

FIG. 6A illustrates a magnified part of the first video signal Sa (interlace signal) at the wipe position WP. In this left image, the first main area part MA1 corresponding to a part before the wipe position WP exists, and the first border area part BA1 corresponding to a part from the wipe position WP to the first position P1 exists. The left image is an image depicting the diagonal line on which the motion picture determination is carried out.

Then, FIG. 6B illustrates a magnified part of the right image before the synthesis based on the second video signal Sb (interlace signal) at the wipe position WP. In this right image, the second border area part BA2 from the second position P2 to the wipe position WP exists, and the second main area part MA2 corresponding to a part after the wipe position WP exists. The left image is an image depicting the diagonal line on which the still image determination is carried out.

FIG. 6C illustrates a magnified part of the synthesized image based on the synthesized video signal (interlace signal) which is output from the selector 101 at the wipe position WP. This synthesized image is composed of the first main area part MA1, the first border area part BA1, the second border area part BA2, and the second main area part MA2. That is, this synthesized image is obtained by taking out a part before the first position P1 from the left image illustrated in FIG. 6A and taking out a part after the second position P2 from the right image illustrated in FIG. 6B.

In general, when the motion determination is carried out, a visually stable interpolation result is aimed to be obtained. When the motion determination result of the target pixel is different from a motion determination result in the vicinity of the pixel, the motion determination including information on the motion determination result in the vicinity of the pixel is carried out. For this reason, in the case of the synthesized image illustrated in FIG. 6C, the motion determination is carried out in the state of the video in the first main area part MA1 and the first border area part BA1 and in the state of the still image in the second border area part BA2 and the second main area part MA2. In the motion determination result, as the motion picture determination area is hatched, which is illustrated in FIG. 6C, a part of the still image part is turned into the motion picture part beyond the position P1 (P2). For this reason, in a case where the interpolation signal generation circuit 221 of the IP conversion circuit 104 generates the interpolation signals through the diagonal interpolation, the image after the IP conversion illustrated in FIG. 6D is obtained.

FIG. 6E illustrates a magnified part of the synthesized image based on the synthesized video signal (progressive signal) output from the selector 106, in other words, the image after removing the border area parts BA1 and BA2 at the wipe position WP (a range surrounded by a broken line). This synthesized image is the same as the expected result illustrated in FIG. 6F, as described above, because the IP conversion processing is carried out in the state where the image is not cut off at the wipe position WP and the images at the switching position (the wipe position WP) can be displayed as the identical images as being displayed on the full screen.

Next, with reference to FIGS. 7A to 7F, a case where the interpolation signals for the motion picture are generated through the vertical interpolation will be described. FIGS. 7A to 7C are the same as FIGS. 7A to 7C. FIG. 7D illustrates the image after the IP conversion in a case where the interpolation signal generation circuit 221 of the IP conversion circuit 104 generates the interpolation signals through the vertical interpolation.

FIG. 7E illustrates a magnified part of the synthesized image based on the synthesized video signal (progressive signal) output from the selector 106, in other words, the image after removing the border area parts BA1 and BA2 at the wipe position WP (a range surrounded by a broken line). This synthesized image is the same as the expected result illustrated in FIG. 7F, as described above, because the IP conversion processing is carried out in the state where the image is not cut off at the wipe position WP, and the image at the switching position (the wipe position WP) can be displayed as the identical images as being displayed on the full screen.

BB. "Solutions for Problems from High Frequency Compensation Circuit"

Figure 8A:
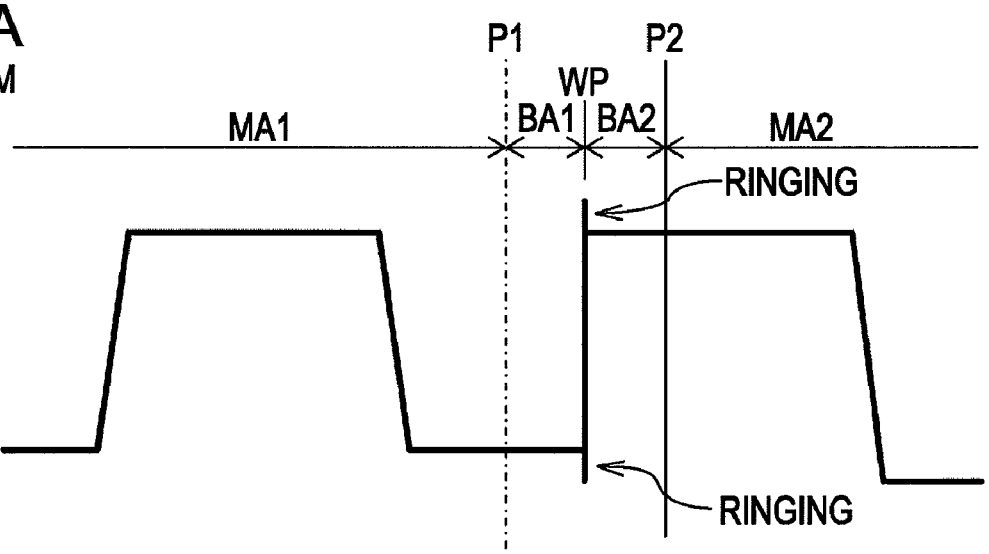
FIGS. 8A and 8B are drawings for describing solutions for problems from a high frequency compensation circuit.
Figure 8B:
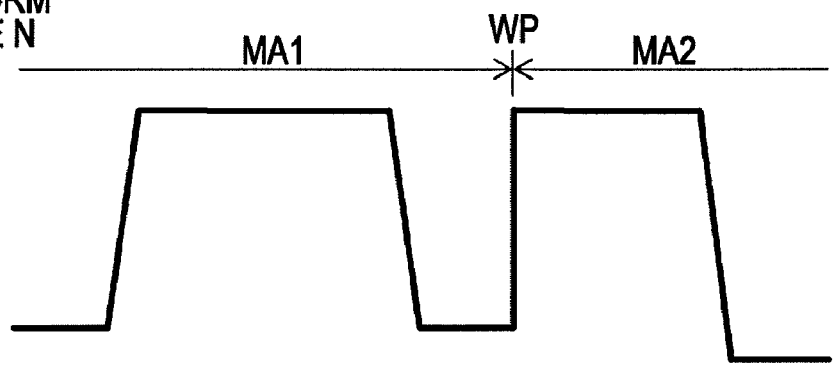

In the high frequency compensation circuit 105, as described above, the high frequency components of the synthesized video signal (progressive signal) which is output from the IP conversion circuit 104 are emphasized. FIG. 8A illustrates a waveform example of the line N in the synthesized video signal which is output from the high frequency compensation circuit 105. In this manner, the waveform of the line N drastically changes at the position P1 (P2), and as illustrated in the drawing, ringings are generated while corresponding to the position P1 (P2). FIG. 8B illustrates a waveform example of the line N in the synthesized video signal after removing the border area parts BA1 and BA2 which is output from the selector 106. As described above, as the high frequency compensation is carried out in the state where the image is not cut off at the wipe position WP, no ringings are generated at the wipe position WP through the high frequency compensation, and the images at the switching position (the wipe position WP) can be displayed as the identical images on the full screen.

Figure 9:
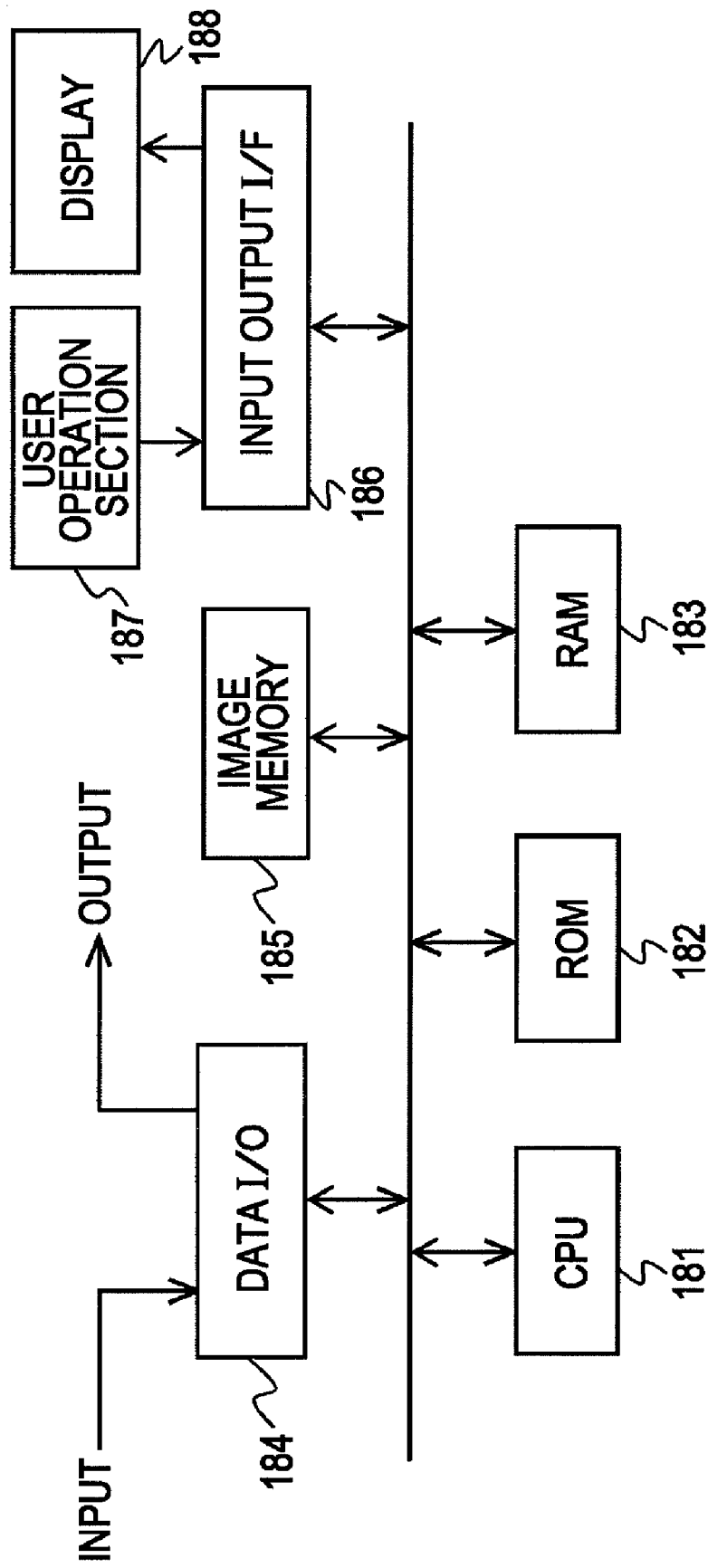
FIG. 9 is a block diagram of a configuration example of a computer apparatus in which the video signal processing for the wipe operation is carried out by using software.

It should be noted that the case where the processing on the video signals supplied to the LCD 109 is performed by using hardware in the above-mentioned image display apparatus 100 has been described, but a similar processing can also be performed by using software. FIG. 9 illustrates a configuration example of a computer apparatus 100A in which the processing is performed by using software. The computer apparatus 100A is composed of a CPU (Central Processing Unit) 181, a ROM (Read Only Memory) 182, a RAM (Random Access Memory) 183, a data input output section (data I/O) 184, an image memory 185, an input output interface (input output I/F) 186, a key board 187, and a display 188.

The ROM 182 stores a processing program for the CPU 181 or the like. The RAM 183 functions as a work area of the CPU 181. The CPU 181 is adapted to read the processing program stored in the ROM 182 when necessary, transfer the read processing program to the RAM 183 to expand the program, and read the expanded processing program to execute the processing on the video signals.

In the computer apparatus 100A, the first video signal Sa and the second video signal Sb are input via the data I/O 184 and accumulated in the image memory 185. The CPU 181 performs a processing for obtain the synthesized video signals (the output of the selector 106 in FIG. 1) to carry out the wipe operation on output signals of the video signals Sa and Sb accumulated in the image memory 185. Then, the signals after the processing are output to the outside from the image memory 185 via the data I/O 184. It should be noted that an image based on the signals after the processing may be displayed on the display 188.

Figure 10:
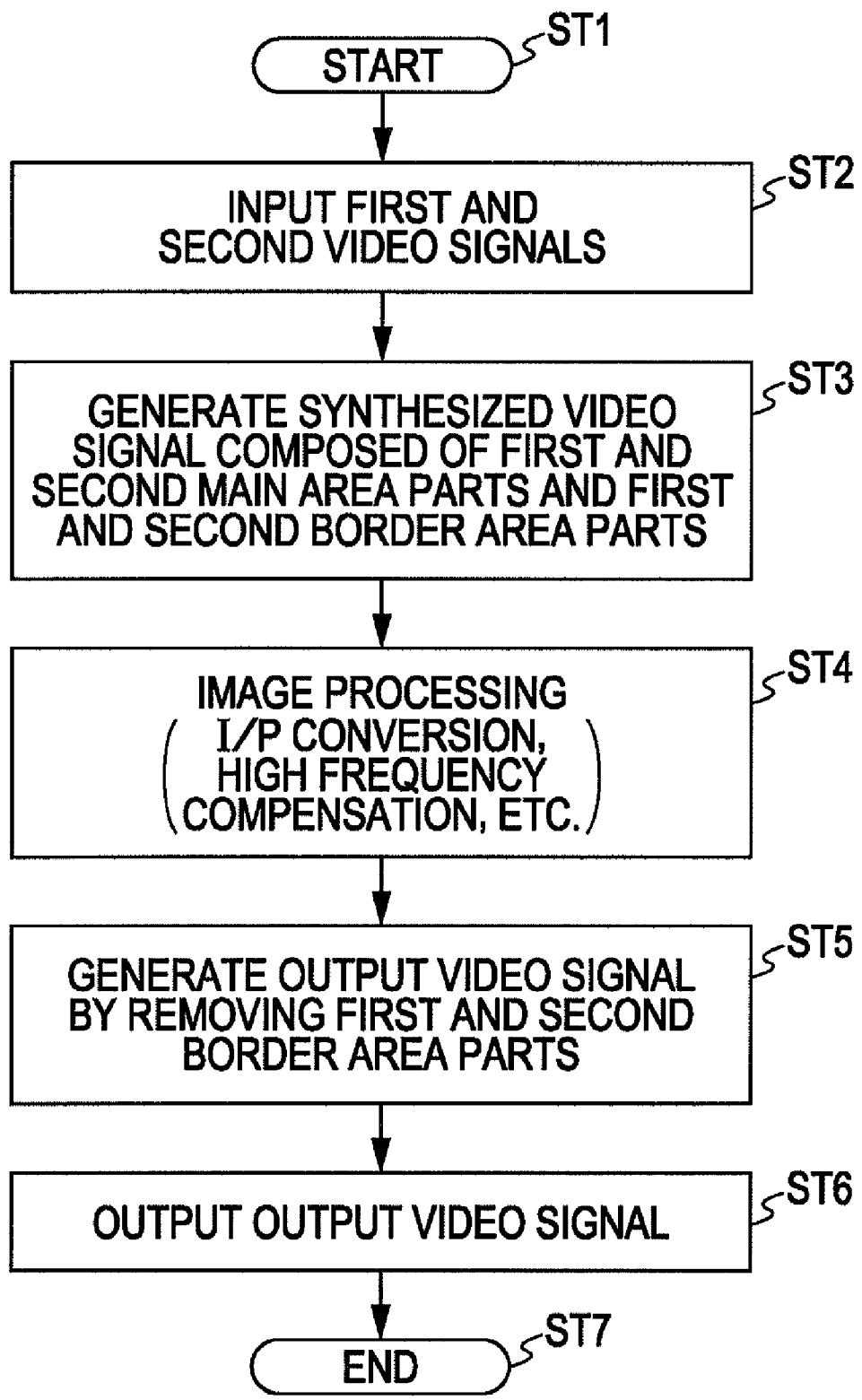
FIG. 10 is a flowchart of a processing procedure of the video signal processing by a CPU.
Figure 11:
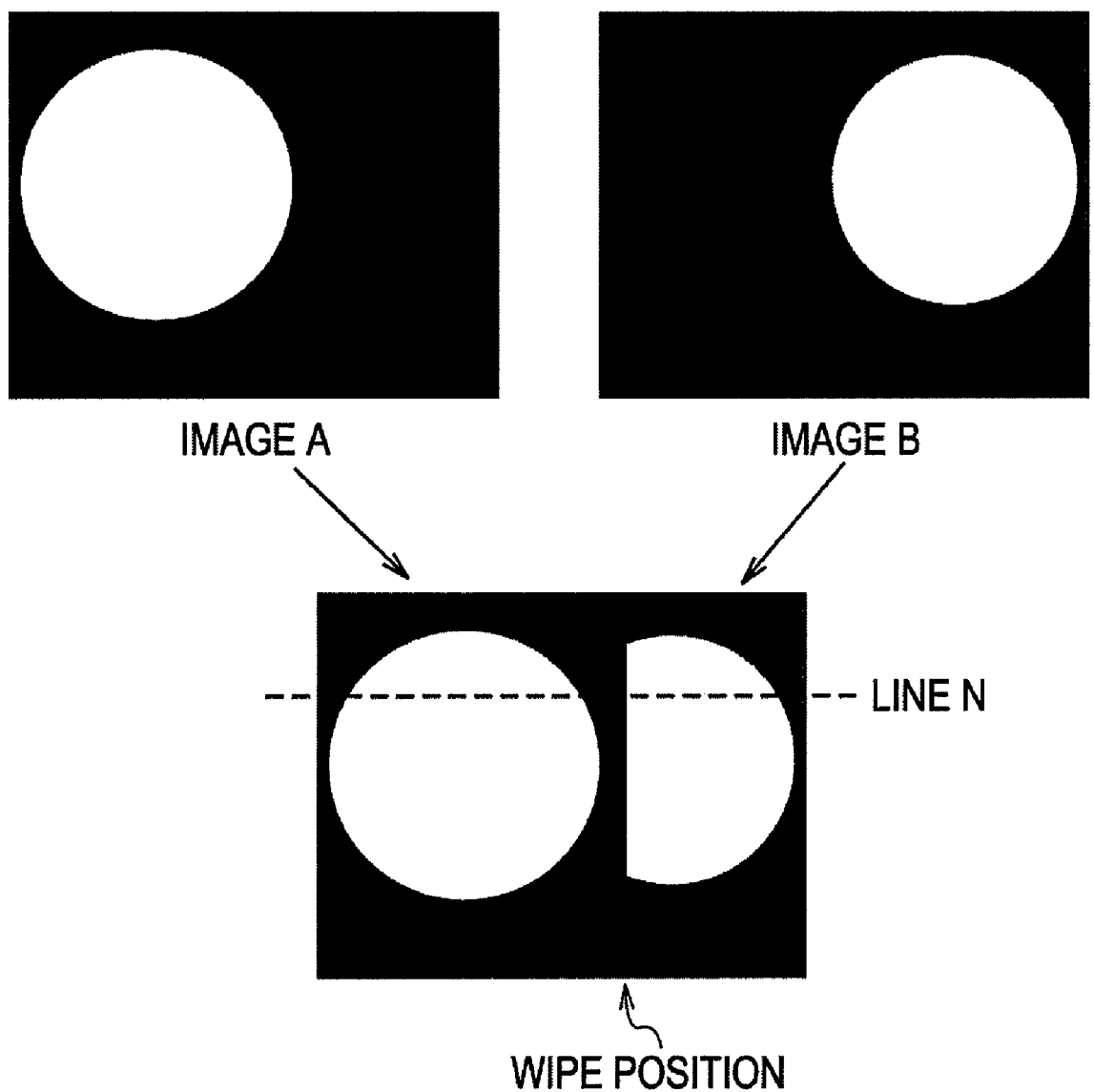
FIG. 11 illustrates an example of the wipe operation.

A flowchart of FIG. 10 illustrates a processing procedure of the video signal processing in the CPU 181. It should be noted that this flowchart corresponds to a processing on the video signals in one field. The relevant processings are sequentially performed on the video signals in the respective fields.

First, the CPU 181 starts a processing in Step ST1, and thereafter, the flow is shifted to Step ST2. In Step ST2, the CPU 181 inputs the first and second video signals Sa and Sb by one field via the data I/O 184 to be stored in the image memory 185.

Next, in Step ST3, in accordance with the wipe position WP, the first position P1, and the second position P2, the CPU 181 takes out the first main area part MA1 and the first border area part BA1 from the first video signal Sa and takes out the second main area part MA2 and the second border area part BA2 from the second video signal Sb to generate the synthesized video signal. This synthesized video signal is equivalent to the output of the selector 101 in the image display apparatus 100 illustrated in FIG. 1.

Next, in Step ST4, the CPU 181 performs the IP conversion processing and the high frequency compensation processing on the synthesized video signal generated in Step ST3. The IP conversion processing is equivalent to the processing of the IP conversion circuit 104 in the image display apparatus 100 illustrated in FIG. 1. Also, the high frequency compensation processing is equivalent to the processing of the high frequency compensation circuit 105 in the image display apparatus 100 illustrated in FIG. 1.

Next, in Step ST5, the CPU 181 removes the first and second border area parts BA1 and BA2 from the synthesized video signal processed in Step ST4 to generate the output video signal. This output video signal is equivalent to the output of the selector 106 in the image display apparatus 100 illustrated in FIG. 1.

Then, in Step ST6, the CPU 181 outputs the output video signal generated in Step ST5 via the data I/O 184 to the outside, and thereafter the processing is ended in Step ST7.

In this manner, even through the processing which is performed in the computer apparatus 100A, it is possible to obtain a similar effect to that of the image display apparatus 100 illustrated in FIG. 1.

It should be noted that in the above-mentioned embodiment, the case where the wipe operation is performed in the horizontal direction has been described, but another embodiment of this present invention can be also similarly applied to a case where the wipe operation is performed in the vertical direction. Also, in the above-mentioned embodiment, the case where the IP conversion processing and the high frequency compensation processing are used as the image processings on the synthesized video signal has been described, but another embodiment of this present invention can be also similarly applied to a case where, for example, a scaling processing or other processing is preformed so that the processing result at the switching position for the images is different from the processing result when no switching is carried out.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus comprising:
   a video signal synthesis section to, when with respect to a border position dividing a screen in one of a horizontal direction and a vertical direction, a position after the border position by a predetermined length is set as a first position and a position before the border position by a predetermined length is set as a second position, take out a first main area part corresponding to a part before the border position of the screen and a first border area part corresponding to a part from the border position to the first position of the screen from a first video signal and also take out a second border area part corresponding to a part from the second position to the border position of the screen and a second main area part corresponding to a part after the border position of the screen from a second video signal to synthesize the signals;
   an image processing section to perform a predetermined image processing on a synthesized video signal output from the video signal synthesis section;
   a video signal output section to remove the first border area part and the second border area part from the synthesized video signal output from the image processing section to obtain an output video signal;
   a first delay circuit to delay the second video signal by a first period of time corresponding to a predetermined number of pixels in one of the horizontal direction and the vertical direction, and
   a second delay circuit to delay the synthesized video signal output from the image processing section by the first period of time.

2. The video signal processing apparatus according to claim 1, wherein: the video signal synthesis section includes
   a first selector to selectively take out, when a position after a second period of time which is half of the first period of time from the border position is set as a first reference position with respect to the first video signal, based on a first switching control signal which is in one state before the first reference position and is in the other state after the first reference position, the first video signal or the second video signal output from the first delay circuit;
   the first selector takes out the first video signal when the first switching control signal is in the one state and takes out the second video signal output from the first delay circuit when the first switching control signal is in the other state;
   the video signal output section includes
   a second selector to selectively take out, when with respect to the synthesized video signal output from the image processing section, a position after the second period of time from a switching position between the first video signal and the second video signal is set as a second reference position, based on a second switching control signal which is in one state before the second reference position and is in the other state after the second reference position, the synthesized video signal output from the image processing section or the synthesized video signal output from the second delay circuit; and
   the second selector takes out the synthesized video signal output from the second delay circuit when the second switching control signal is in the one state and takes out the synthesized video signal output from the image processing section when the second switching control signal is in the other state.

3. The video signal processing apparatus according to claim 1, wherein:
   the first video signal and the second video signal are interlace signals; and
   the image processing section includes a conversion circuit a to convert the interlace signal to a progressive signal.

4. The video signal processing apparatus according to claim 3, wherein the conversion circuit includes
   a motion determination section to determine whether this display is a motion picture or a still image based on the interlace signal, and
   an interpolation signal generation section to generate an interpolation signal from the interlace signal in accordance with a determination result of the motion determination section.

5. The video signal processing apparatus according to claim 4, wherein the interpolation signal generation section generates the interpolation signal by using a signal in the same field through one of a diagonal interpolation and a vertical interpolation when the motion determination section determines that this display is the motion picture.

6. The video signal processing apparatus according to claim 1, wherein the image processing section includes
   a high frequency compensation circuit to emphasize a high frequency component of the video signal.

7. A video processing method comprising the steps of:
   taking out, when with respect to a border position dividing a screen in one of a horizontal direction and a vertical direction, a position after the border position by a predetermined length is set as a first position and a position before the border position by a predetermined length is set as a second position, a first main area part corresponding to a part before the border position of the screen and a first border area part corresponding to a part from the border position to the first position of the screen from a first video signal and also taking out a second border area part corresponding to a part from the second position to the border position of the screen and a second main area part corresponding to a part after the border position of the screen from a second video signal to synthesize the signals;
   performing a predetermined image processing on a synthesized video signal obtained from the synthesizing;
   removing the first border area part and the second border area part from the synthesized video signal subjected to the image processing to obtain an output video signal;
   delaying the second video signal by a first period of time corresponding to a predetermined number of pixels in one of the horizontal direction and the vertical direction, and
   delaying the synthesized video signal output from the image processing section by the first period of time.

8. A non-transitory computer-readable storage medium having stored thereon a computer program that can be read into a computer for instructing the computer to function as a video signal processing apparatus, the video signal processing apparatus including:
   video signal synthesis means to, when with respect to a border position dividing a screen in one of a horizontal direction and a vertical direction, a position after the border position by a predetermined length is set as a first position and a position before the border position by a predetermined length is set as a second position, take out a first main area part corresponding to a part before the border position of the screen and a first border area part corresponding to a part from the border position to the first position of the screen from a first video signal and also take out a second border area part corresponding to a part from the second position to the border position of the screen and a second main area part corresponding to a part after the border position of the screen from a second video signal to synthesize the signals;

image processing means to perform a predetermined image processing on a synthesized video signal output from video signal synthesis means;

video signal output means to remove the first border area part and the second border area part from the synthesized video signal output from the image processing means to obtain an output video signal;

a first delay means to delay the second video signal by a first period of time corresponding to a predetermined number of pixels in one of the horizontal direction and the vertical direction, and a second delay means to delay the synthesized video signal output from the image processing means by the first period of time.

9. An image display apparatus comprising:

a video signal processing circuit to synthesize a first video signal and a second video signal; and an image display element to display, based on a video signal output from the video signal processing circuit, with respect to a border position dividing a screen in one of a horizontal direction and a vertical direction, an image based on the first video signal before the border position and an image based on the second video signal after the border position, wherein the video signal processing circuit includes a video signal synthesis section to, when a position after the border position by a predetermined length is set as a first position and a position before the border position by a predetermined length is set as a second position, take out a first main area part corresponding to a part before the border position of the screen and a first border area part corresponding to a part from the border position to the first position of the screen from a first video signal and also take out a second border area part corresponding to a part from the second position to the border position of the screen and a second main area part corresponding to a part after the border position of the screen from a second video signal to synthesize the signals, an image processing section to perform a predetermined image processing on a synthesized video signal output from the video signal synthesis section, a video signal output section to remove the first border area part and the second border area part from the synthesized video signal output from the image processing section to obtain an output video signal;

a first delay circuit to delay the second video signal by a first period of time corresponding to a predetermined number of pixels in one of the horizontal direction and the vertical direction, and a second delay circuit to delay the synthesized video signal output from the image processing section by the first period of time.

* * * * *